United States Patent [19]

Kent et al.

[11] Patent Number: 4,845,722
[45] Date of Patent: Jul. 4, 1989

[54] COMPUTER INTERCONNECT COUPLER EMPLOYING CROSSBAR SWITCHING

[75] Inventors: Allan R. Kent, Arlington; Robert E. Stewart, Stow; Harold A. Read, Burlin, all of Mass.; Barry A. Henry, Penacook, N.H.; Charles E. Kaczor, Dudley, Mass.; Milton V. Mills, Boston, Mass.; Ronald C. Carn, Millis, Mass.; Donald R. Metz, Ashburnham, Mass.

[73] Assignee: Digital Equipment Corporation, Maynard, Mass.

[21] Appl. No.: 109,503

[22] Filed: Oct. 16, 1987

[51] Int. Cl.$^4$ ............................................. H04J 3/02
[52] U.S. Cl. ....................................... 370/58; 370/85; 340/825.8
[58] Field of Search ....................... 370/60, 58, 63, 85; 340/825.5, 826, 825.79, 825.8

[56] References Cited

U.S. PATENT DOCUMENTS

| | | | |
|---|---|---|---|
| 3,979,733 | 9/1976 | Fraser | 340/172.5 |
| 4,380,063 | 4/1983 | Janson et al. | 370/60 |
| 4,450,572 | 5/1984 | Stewart et al. | 375/87 |
| 4,484,030 | 11/1984 | Gavrilovich | 179/8 A |
| 4,577,308 | 3/1986 | Larson et al. | 370/9 |
| 4,603,416 | 6/1986 | Servel et al. | 370/60 |
| 4,613,969 | 9/1986 | Draayer | 370/58 |
| 4,615,028 | 9/1986 | Lewis et al. | 370/58 |
| 4,616,358 | 10/1986 | Rehm et al. | 370/58 |
| 4,630,046 | 12/1986 | Rein | 340/825.93 |
| 4,630,258 | 12/1986 | McMillen et al. | 370/60 |
| 4,630,259 | 12/1986 | Larson et al. | 370/60 |
| 4,630,260 | 12/1986 | Toy | 370/60 |
| 4,635,250 | 1/1987 | Georgiou | 370/58 |
| 4,638,475 | 1/1987 | Koike | 370/60 |
| 4,639,910 | 1/1987 | Toegel et al. | 370/58 |
| 4,653,085 | 3/1987 | Chan et al. | 379/94 |
| 4,654,842 | 3/1987 | Coraluppi et al. | 370/16 |
| 4,656,622 | 4/1987 | Lea | 370/60 |
| 4,661,947 | 4/1987 | Lea et al. | 370/16 |
| 4,672,604 | 6/1987 | Bhatia et al. | 370/58 |
| 4,679,186 | 7/1987 | Lea | 370/14 |
| 4,679,190 | 7/1987 | Dias et al. | 370/60 |
| 4,692,917 | 9/1987 | Fujioka | 370/60 |
| 4,695,999 | 9/1987 | Lebizay | 370/58 |
| 4,696,000 | 9/1987 | Payne, III | 370/60 |
| 4,706,150 | 11/1987 | Lebizay et al. | 340/825.8 |
| 4,719,459 | 1/1988 | Kovacs et al. | 340/825.8 |
| 4,752,777 | 6/1988 | Franaszek | 340/825.79 |

Primary Examiner—Douglas W. Olms
Assistant Examiner—Frank M. Scutch, III
Attorney, Agent, or Firm—Arnold, White & Durkee

[57] ABSTRACT

A computer interconnect coupler has a set of junctors which are assigned to channel transmitters and channel receivers for the routing of messages from the channel receivers which are addressed to the channel transmitters. When a message is received by a channel receiver, the channel receiver stores the beginning portion of the message in a first-in-first-out buffer, and sends a route message request to central switch logic. If the destination transmitter or receiver is busy, the central logic places the message request on a destination queue and returns a signal to the requesting source transmitter to turn on a flow control signal which is transmitted back to the data processing device having originated the message. Any message addressed to this data processing device, however, is inserted into the flow control carrier with pauses both before and after the message, and provisions are also made to allow the data processing device to return an acknowledgment code responsive to the imcoming message. To permit incremental expansion of the coupler to accommodate an increased number of channels, additional channel interface boards may be added and a hierarchical rotating priority scheme enables the additional channels to have equal priority with the previously existing channels without requiring reprogramming. Moreover, the processing and queueing of routing requests is made more effective by grouping the requests into different priority levels and using separate but duplicate arbitration logic to resolve simultaneous requests within the same priority group.

35 Claims, 23 Drawing Sheets

RX LOGIC MESSAGE SYNCHRONIZER AND CYCLE COUNTER

RX AND TX LOGIC FOR MESSAGE QUEUING

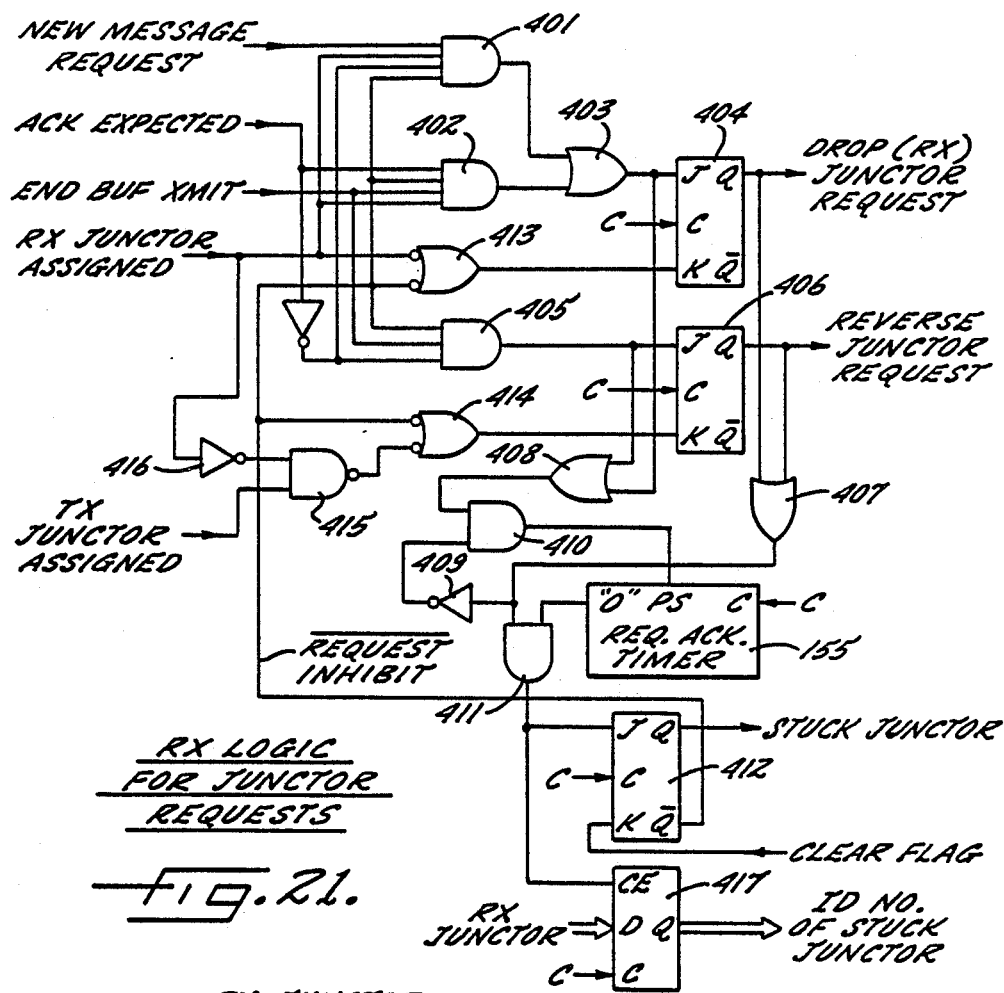
*Fig. 21.* RX LOGIC FOR JUNCTOR REQUESTS
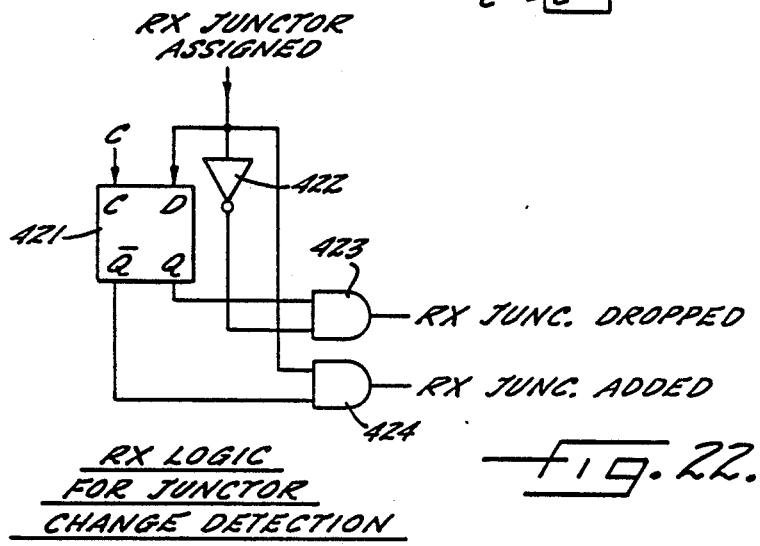
*Fig. 22.* RX LOGIC FOR JUNCTOR CHANGE DETECTION

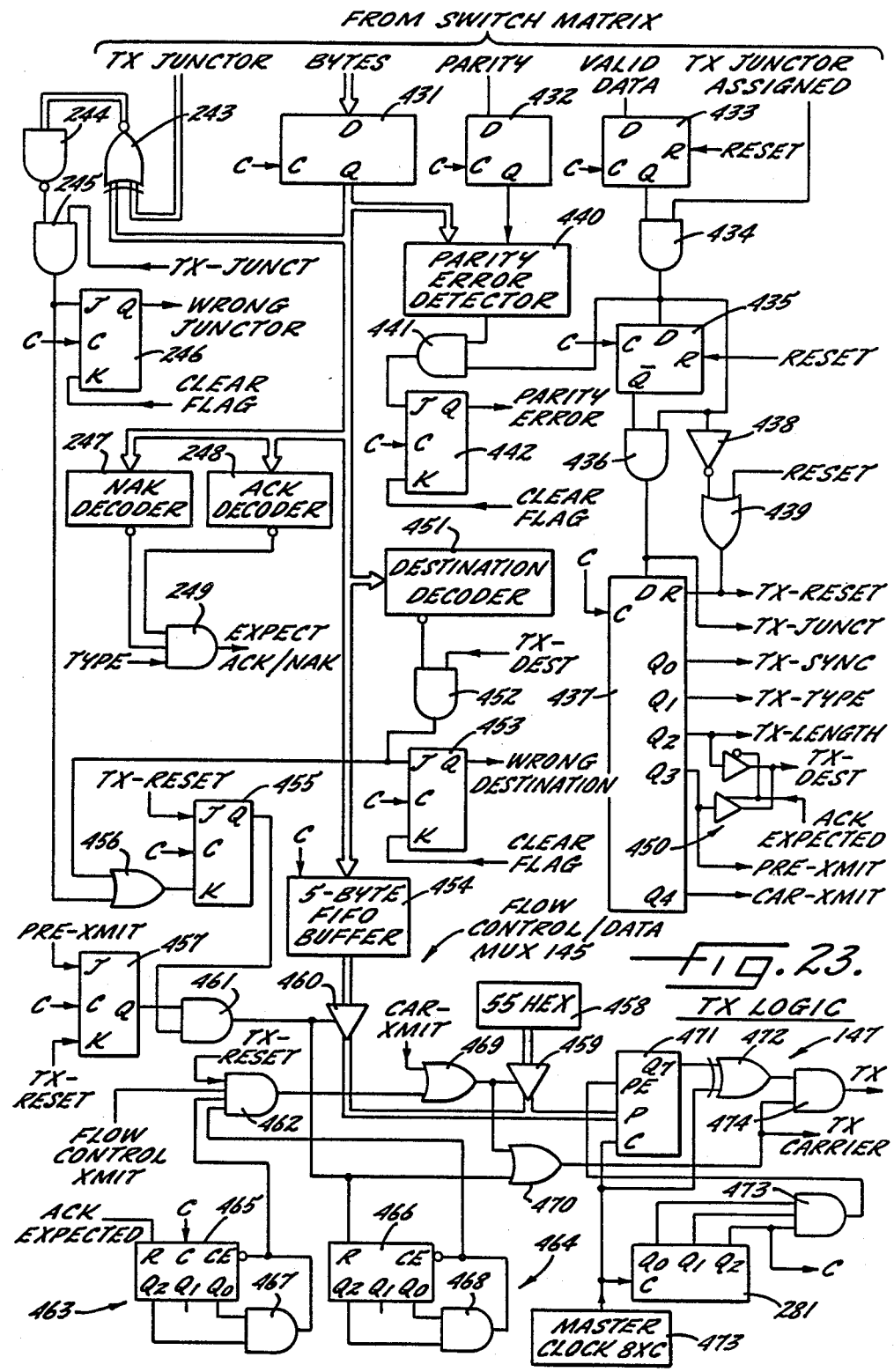
Fig. 23. TX LOGIC

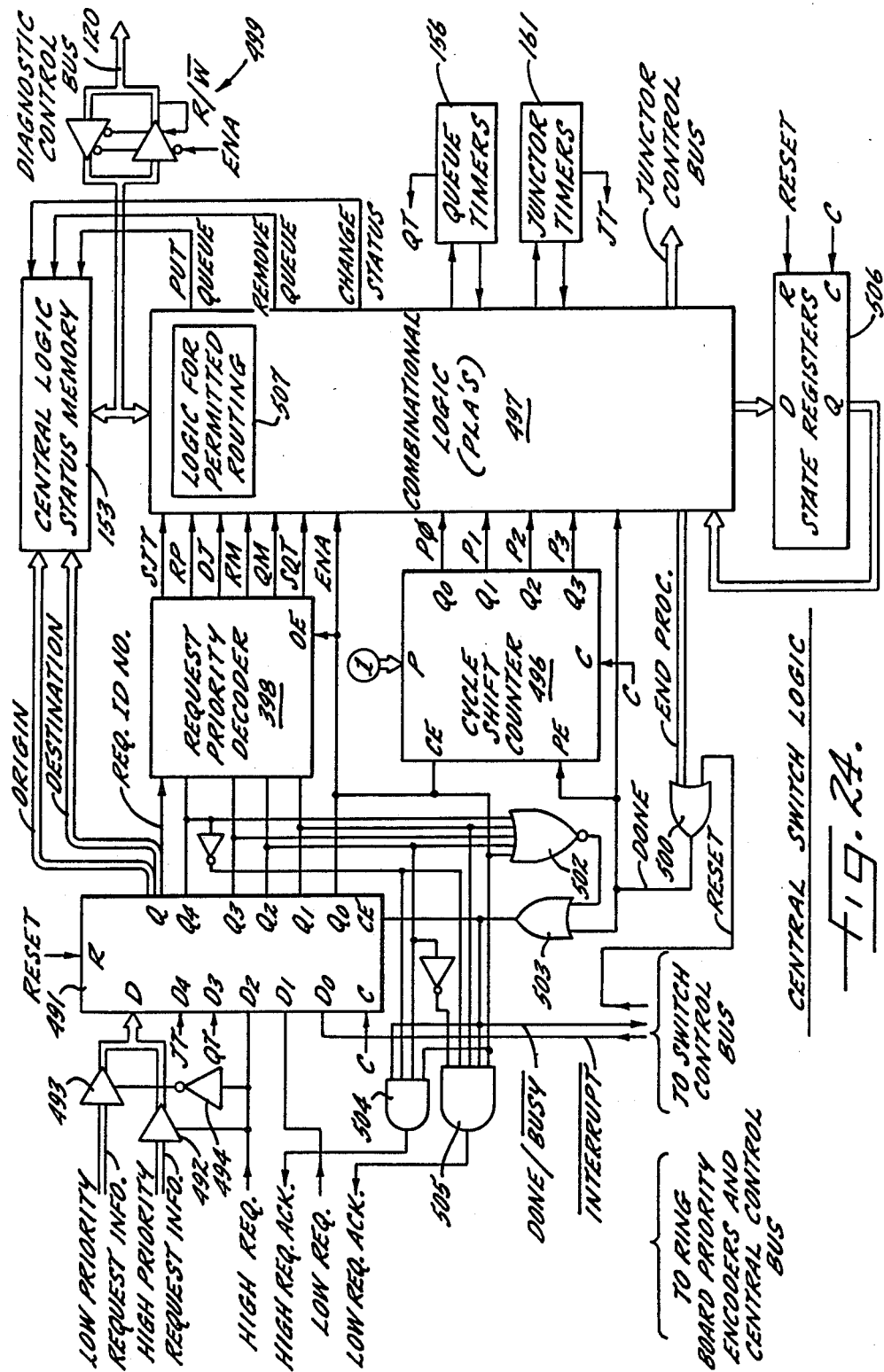

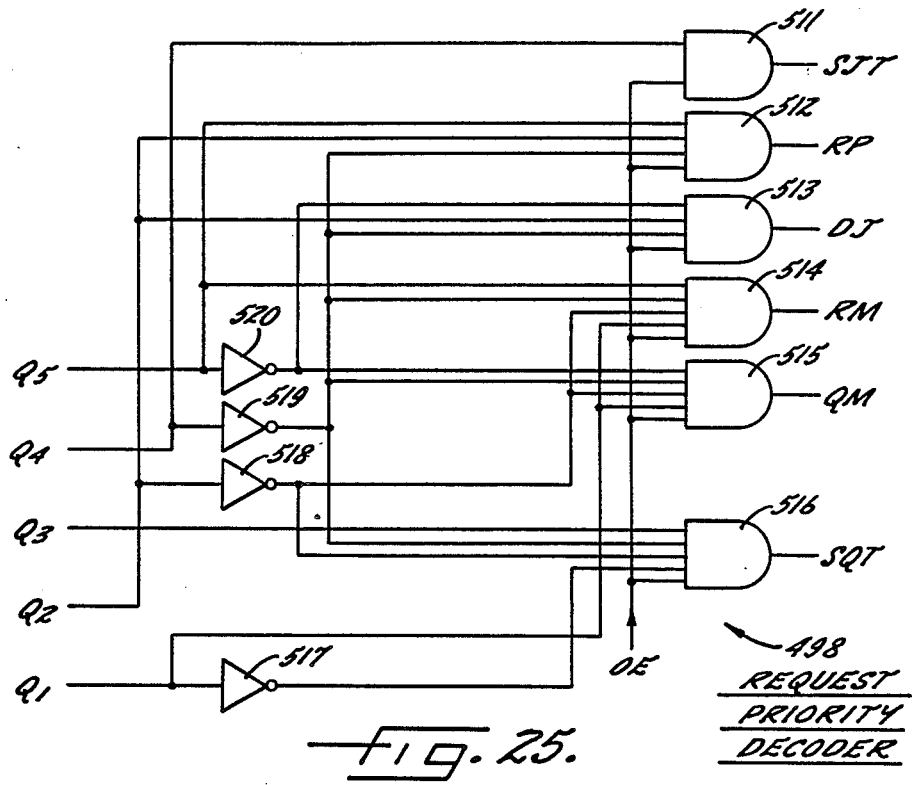
Fig. 25. — 498 REQUEST PRIORITY DECODER
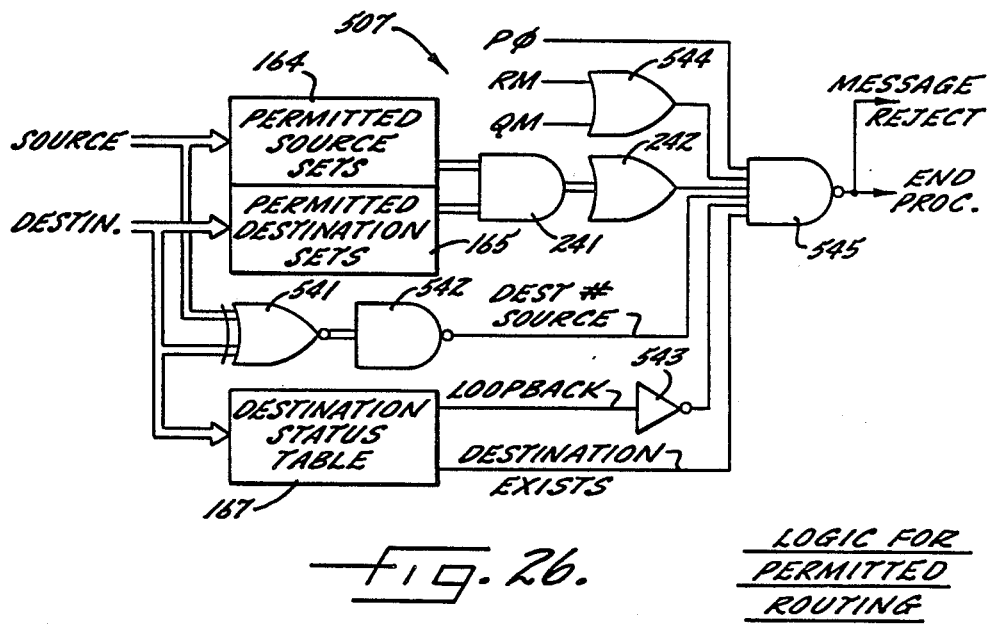
Fig. 26. — LOGIC FOR PERMITTED ROUTING

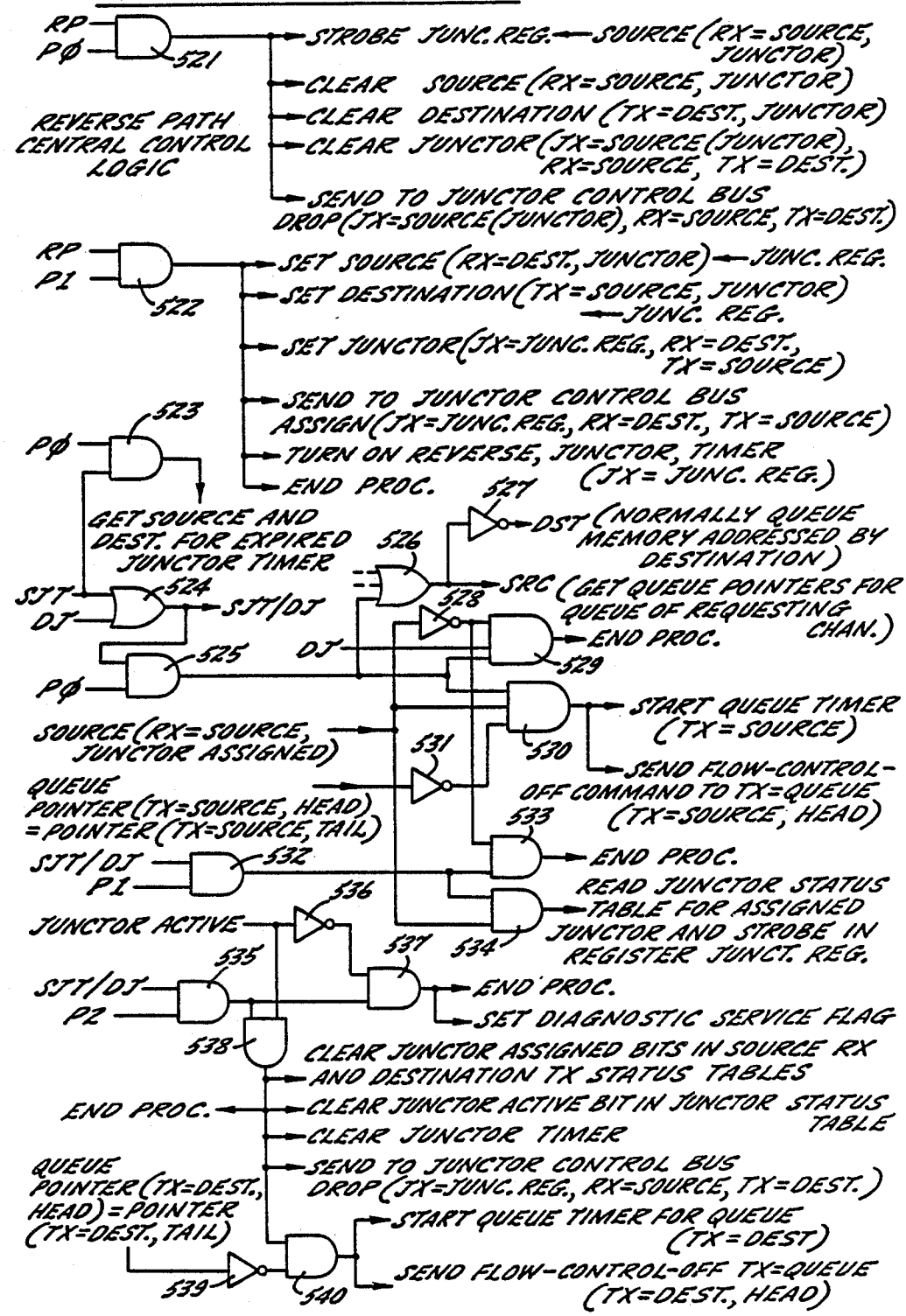

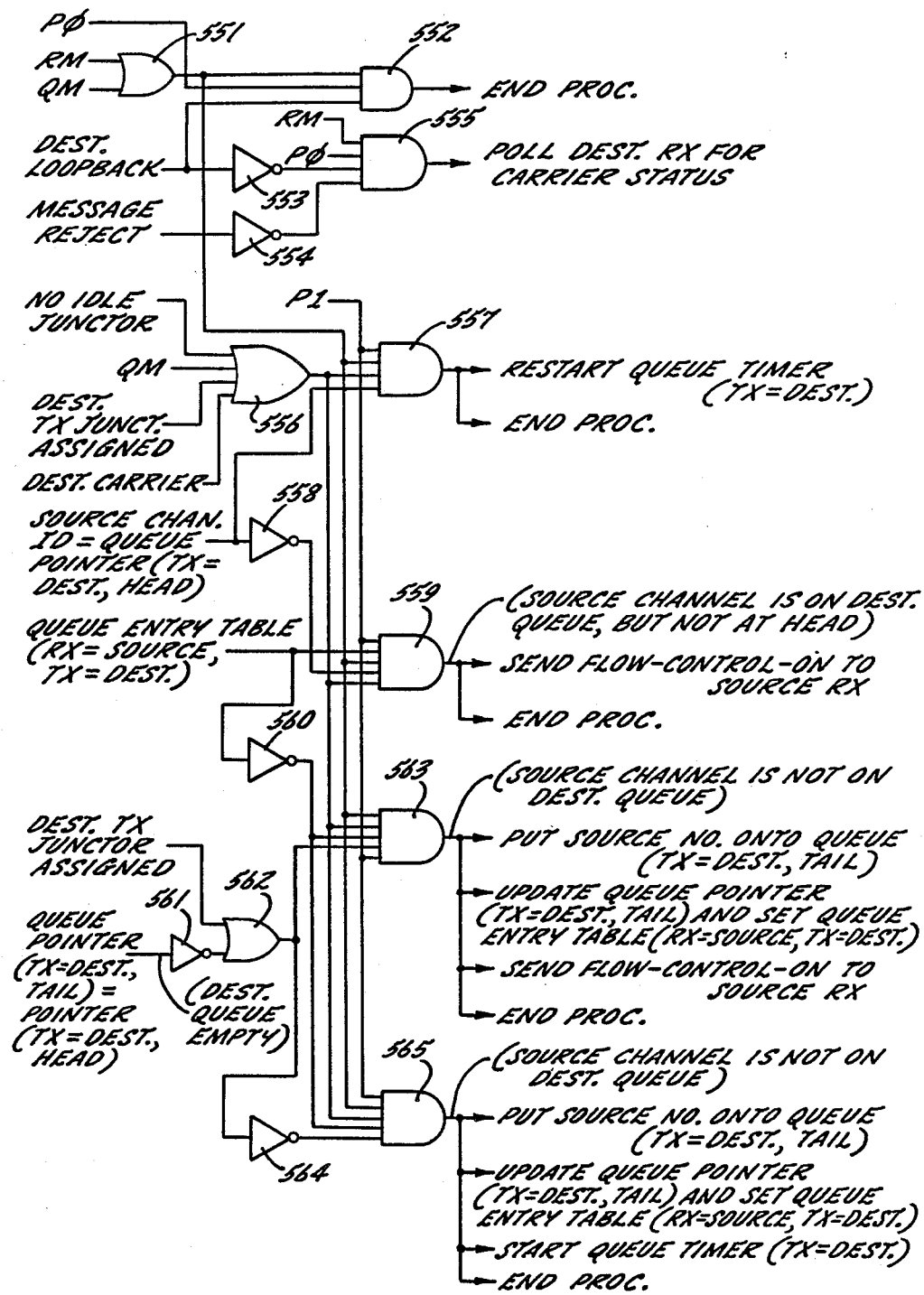
Fig. 28. COMBINATIONAL LOGIC FOR MESSAGE QUEUING

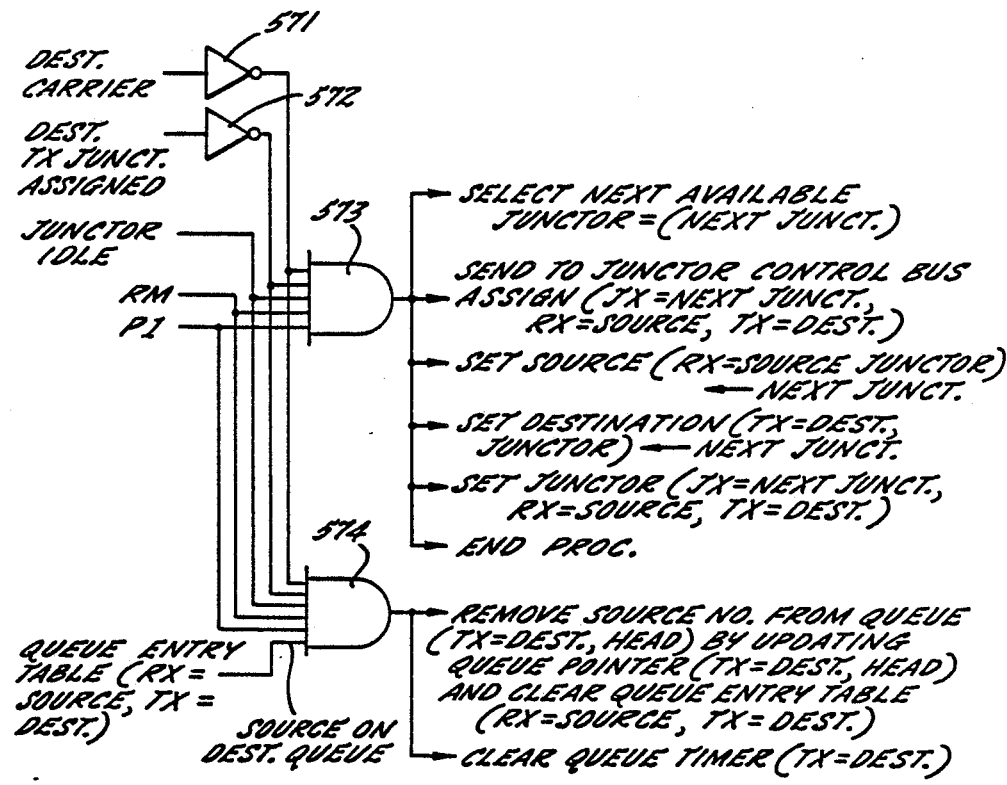
FIG. 29. COMBINATIONAL LOGIC FOR ROUTING MESSAGE
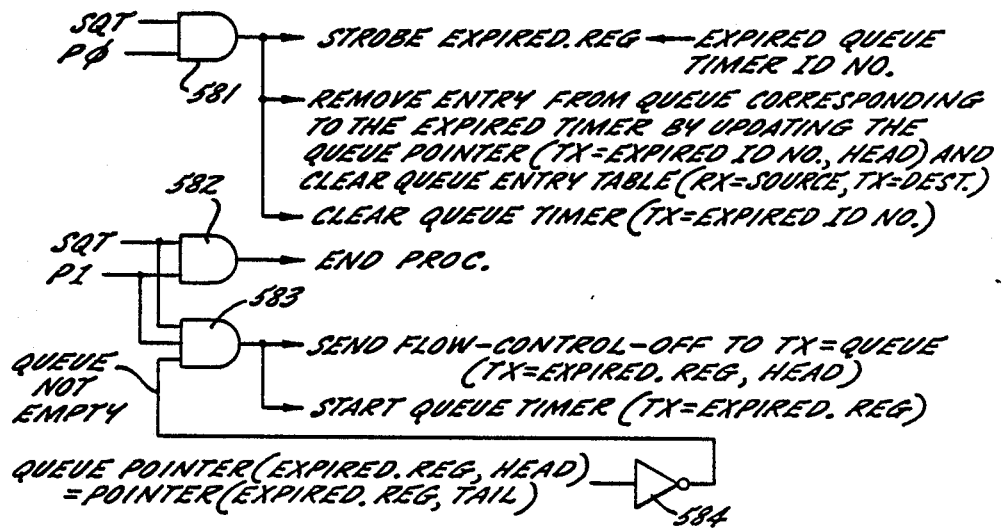
FIG. 30. COMBINATIONAL LOGIC FOR SERVICING QUEUES HAVING EXPIRED TIMERS

COMPUTER INTERCONNECT COUPLER EMPLOYING CROSSBAR SWITCHING

BACKGROUND OF THE INVENTION

1. Field of the Invention

This invention relates generally to the field of computer system interconnections, and more particularly to the transmission of data packets among various data processing devices in a computer system. Specifically, the invention relates to a computer interconnect coupler which arbitrates the transmission of addressed data packets among the various data processing devices.

2. Description of the Related Art

A conventional digital computer system comprises at least a memory, an input-output device, and a data processor. The memory stores information in addressable storage locations. This information includes data and instructions for processing the data, including commands and responses. The data processor transfers information to and from the memory, interprets the incoming information as either data or instructions, and processes the data in accordance with the instructions. The input-output device also communicates with the memory in order to store input data and output processed data.

A small computer system typically includes a central processing unit, memory, an input-output unit, and a power supply mounted together in a cabinet. The cabinet is built around a frame having a rack or "card cage" defining parallel-spaced slots for receiving printed circuit boards including the central processing unit, memory, and input-output unit. The interior edge portions of the circuit boards include terminals which mate with connections on a "back plane" of the card cage. The "back plane" has a number of parallel conductors or buses which interconnect the boards, connect the boards to the power supply, and connect the input/output unit to a number of input/output ports. The buses convey addresses and data, control and status signals, and power and ground. The input/output ports typically include a port for a console terminal, and at least one port for a high-speed input-output device or mass memory such as a floppy disc drive, a tape drive, a high-speed printer, or a hard disc drive.

Advances in circuit technology have made it practical to use additional data processors dedicated to serving respective memory or input/output devices. Therefore, in the cabinet for a typical central processing unit, there is likely to be found a first data processor used for numerical computations, and a second data processor used for controlling the central memory, for example, for formatting or buffering input-output data in one portion of the memory while numerical computations are being performed on data in another portion of the memory. Moreover, the input-output or mass memory devices external to the cabinet for the central processing unit typically have at least one data processing unit or "server" for buffering data and for controlling the devices in response to high-level commands from a central processor.

In recent years, a need has arisen for computation and data storage capabilities exceeding those provided by a few central processing units. For special applications, such as large-scale simulation, these data processing needs can only be met by large computers having a number of central processors and memory linked together by address, data, and control buses. For general applications, however, it is more economical to construct computer networks wherein a number of conventional central processing units, input-output devices, and mass memory devices are located at different positions and are interconnected to communicate with each other. Typically the central processing units share one or more mass memory units to access and update a common data base.

Although there are numerous information transfer schemes which could be used for communication among the data processing devices in a network, the typical method is to use a shared communications resource (i.e., channel or bus) which interconnects the various elements. In general, a transmission between two devices over a shared bus requires two steps, since each device has the capability of originating a transmission at the same time. The first step is for the initiating unit to obtain control of the bus for some more or less defined interval. The second step is for the initiating unit to transfer information over the bus.

Obtaining control of the bus requires arbitration to select a particular one of the devices desiring bus access. There are two general approaches to arbitration, which are known as "central" arbitration and "distributed" arbitration. In central arbitration, a single, central priority circuit or device receives all requests for bus access and determines which requesting device at any given time should be accorded the greatest priority and allowed to use the bus. Once that device is selected, it is allowed to control the bus and effect the transfer. By contrast, in distributed arbitration, each unit connected to the bus is assigned a specific priority and each unit individually determines whether it has sufficient priority to obtain control of the bus when it desires to do so. If a unit of higher priority simultaneously seeks bus access, a device of lower priority must wait until some later time when it is the highest priority requester.

A distributed arbitration scheme known as "carrier-sense multiple access with collision detection" (CSMA/CD) permits a number of devices to communicate over a single bit-serial line such as a coaxial cable. Each device includes circuitry for monitoring the channel and indicating whenever two devices are transmitting at the same time. When a device which is transmitting detects that another device is transmitting at the same time, the two devices stop transmitting. Both then retry transmission after the channel is clear. One kind of conventional coaxial cable serial data communication network is known as "Ethernet." The Ethernet operates at up to 10 megabits per second and typically provides up to 1,023 addressable devices on a segment of the network. The Ethernet is especially useful for linking a large number of timesharing terminals to a central processing unit.

High speed information transfer over a shared bus between separate data processing devices involves additional requirements such as rapid synchronization, isolation, and highly reliable data transfer. Special hardware and communications protocols have been devised to meet these requirements.

Due to variations in propagation velocity, it is relatively impractical to transmit data at high speed in parallel fashion over a multi-line bus connecting distant data processing devices. Also, due to the requirement of fast synchronization, it is undesirable to transmit data in a non-return-to-zero format. Preferably one or more serial data streams are transmitted in a modulated or self-clocking format. The preferred format is Manchester encoding, as described in Stewart U.S. Pat. No. 4,592,072 and Stewart et al. U.S. Pat. No. 4,450,572, which are herein incorporated by reference. Manchester encoding also has the advantage of removing the DC and lower-frequency components of the data signal, so that the encoded signal will readily pass through simple isolation transformers.

Reliable data transmission is especially important in computer networks having a shared data base. In such a case, any interruption in the updating of a data base must be detected by the updating central processor in order to correct the errors which may occur, and also the interruption must be detected by the memory server in order to prevent other central processors from using partially changed or obsolete data.

A communications protocol for achieving reliable high-speed data transmission is disclosed in Strecker et al. U.S. Pat. No. 4,560,985 which is herein incorporated by reference. Arbitration is preferably performed on a rotating or "round robin" basis so that on the average, each data processing device on a shared channel has an equal chance of obtaining access. The absence of a carrier on the channel indicates that a data processing device may attempt to obtain access. An arbitration timer indicates transmission failure when the carrier fails to be absent within a certain timeout period. Collisions of data packets or other transmission errors are detected by an error detecting code such as a cyclic redundancy check.

When a data processing device correctly receives a data packet, it immediately acknowledges receipt of that packet by return transmission of an acknowledgment code. If the data packet was processed upon receipt, a positive acknowledgment code (ACK) is returned. If the information packet was correctly received but could not be processed, a negative acknowledgment code (NAK) is returned. In a typical case, the negative acknowledgment code signals that the received data packet could not be processed upon receipt due to unavailability of a buffer, and therefore the received data packet was discarded.

Arbitration for transmission of the acknowledgment code is not required; the code is transmitted as soon as the carrier of the received data packet is removed from the transmission channel. Transmission of the acknowledgment code must be completed within a certain time period. After this time period, the other data processing devices may begin to arbitrate and transmit additional data packets.

If a data processing device fails to receive an acknowledgment code immediately after transmission of a data packet, retransmission should be attempted consecutively up to a predetermined number of times. Similarly, if a negative acknowledgment code is received, retransmission should be attempted for a somewhat greater number of times. In order to break deadlocks, a pseudorandom or "coin flip" decision should be made when the data packet is available for retransmission. If the result of the decision is TRUE, retransmission is attempted. If the result of the decision is FALSE, the data processing device waits for a certain delay time interval and repeats the decision process. The delay time interval, for example, should be at least the minimum amount of time for all of the data processing devices to access the channel; in other words, if all of the data processing units were attempting retransmission, there should be some time available for the transmission of data packets and retransmission of acknowledgment codes, aside from the time required to detect collisions and arbitrate.

Alternative transmission channels are required to assure high availability and reliability in communication. As disclosed in Strecker et al. U.S. Pat. No. 4,490,785, herein incorporated by reference, the selection of alternative channels should be made on a random basis, with all channels being equally probable. The task of channel selection should be done by an interface circuit which is shared among the alternative channels.

For coupling data processing devices which use the abovementioned communications techniques, a cluster of the devices are typically connected directly to a pair of centrally located signal transformers having a separate winding for each device. Each transformer provides a shared channel interconnecting the data processing devices, and the central location of the transformers assures a minimal transmission delay. Such a computer interconnect coupler, however, has a somewhat limited connectivity due to the limited transmission bandwidth or throughput of the shared channel. If additional data processing devices were to be interconnected to a central transformer, each processor would be guaranteed a proportionally smaller share of the transmission bandwidth. Therefore, to interconnect additional data processing units, it is necessary to add additional channels so that transmission may occur simultaneously over a number of channels. In this case, however, each data processing unit must be provided with additional ports and interface circuitry. Moreover, the ports and interface circuitry cannot merely be duplicated since additional means are required for selecting a particular port for transmission, and obtaining incoming data from a particular one of the ports. It is especially undesirable to make such modifications on existing computer equipment.

SUMMARY OF THE INVENTION

The primary goal of the present invention is to provide an improved computer interconnect coupler which provides increased connectivity and bandwidth but does not require substantial modifications to existing computer equipment.

Another objective of the invention is to provide such an improved computer interconnect coupler with the capability of easily changing the configuration of the cluster of interconnected devices. A related objective of the invention is to provide such a coupler with redundant channels and insure that the configuration is consistent for each redundant channel.

Yet another objective of the invention is to provide such an improved computer interconnect coupler with the capability of incremental expansion to interconnect additional computer equipment.

To attain these and other objectives, a computer interconnect coupler is provided which has a plurality of electronic crossbar switches each of which is connected to a communication port of a data processing devices to provide a communication channel for receiving messages from and sending messages to that device, the crossbar switches having separate receiving means and transmitting means for each of the channels; a plurality of junctors associated with each of the crossbar switches for transmitting messages among the crossbar switches; and central switch logic means connected to all of the crossbar switches for assigning junctors to transmit the messages arriving at one of the crossbar switches from a source device to a crossbar switch connected to a destination device designated by the message.

In a preferred embodiment the routing procedure is rendered transparent to the originating data processor by storing at least an initial portion of the message in a first-in-first-out buffer during the time required for carrying out the routing procedure. Due to the practical constraint of limited buffer capacity, some messages destined for a busy channel must be discarded. To enable these messages to be retransmitted and routed on a first-come-first-serve basis once the destination channel is no longer busy, a request to route a message to a busy channel is put on a respective first-in-first-out queue assigned to the destination channel. The destination queue therefore stores an ordered list of the unsatisfied requests for access to the respective channel. Once the channel is no longer busy, the channel is temporarily reserved for satisfying the oldest request at the head of the queue. The request at the head of the queue is removed from the queue when the retransmitted message is routed, or at the expiration of a predetermined time interval.

In order that routing circuitry is not burdened by servicing retransmissions of a discarded message prior to the time that the destination channel becomes available and earlier unsatisfied requests have been serviced, the preferred embodiment also transmits a "flow control" signal to the data processing device of the source channel to inhibit retransmission until the destination channel becomes temporarily reserved for the source channel when the queued request from that source channel appears at the head of the queue.

In order to restrict access to selected channels and to enable messages originating from predesignated channels to be routed to the channels of restricted access, the interconnect coupler stores predefined sets of source channels and respective sets of destination channels. The routing of a message from a source channel which is addressed to a destination channel is permitted only if the source channel is included in at least one of these sets of source channels and the addressed destination channel is included in a corresponding set of destination channels. This "virtual star coupling" of ports prevents the transmission of incorrectly addressed or unauthorized messages, and therefore enhances the integrity, efficiency, and security of the data processing system.

The reliability of the computer interconnect coupler is greatly enhanced by providing a pair of such couplers which are linked together to ensure a mutually consistent definition of the virtual star coupling and also to share diagnostic information about possible malfunctions of the data processing devices interconnected in the system. The reliability of the system is further enhanced by providing diagnostic capabilities in each of the couplers so that internal faults will be quickly diagnosed and repaired. To facilitate the repair process and enhance the likelihood that a defective circuit will be properly repaired before being re-installed, pertinent internal diagnostic information about the defective circuit is stored in a nonvolatile memory on the circuit board for the defective circuit, so that the information will be physically carried to the repair facility along with the defective circuit.

BRIEF DESCRIPTION OF THE DRAWINGS

Other objects and advantages of the invention will become apparent upon reading the following detailed description and upon reference to the drawings in which:

FIG. 21 is a schematic diagram of receiver logic for generating service requests for reversing and dropping a junctor;

FIG. 22 is a schematic diagram of receiver logic for detecting changes in the assignment of a junctor to the receiver;

FIG. 23 is a schematic diagram of transmitter control logic;

FIG. 24 is a schematic diagram of the central switch logic which processes service requests for routing messages, reversing and dropping junctors, and for queuing and dropping message routing requests;

FIG. 25 is a schematic diagram of a request priority decoder used in the central switch logic;

FIG. 26 is a schematic diagram of central switch logic for determining whether a routing request is permissible;

FIG. 27 is a schematic diagram of combinational logic which is used by the central switch logic for servicing requests for reversing and dropping junctors;

FIG. 28 is a schematic diagram of combinational logic used by the central switch logic for queuing a message routing request;

FIG. 29 is a schematic diagram of combinational logic used by the central switch logic for routing a message; and FIG. 30 is a schematic diagram of combinational logic used by the central switch logic for dropping message routing requests.

Figure 1:
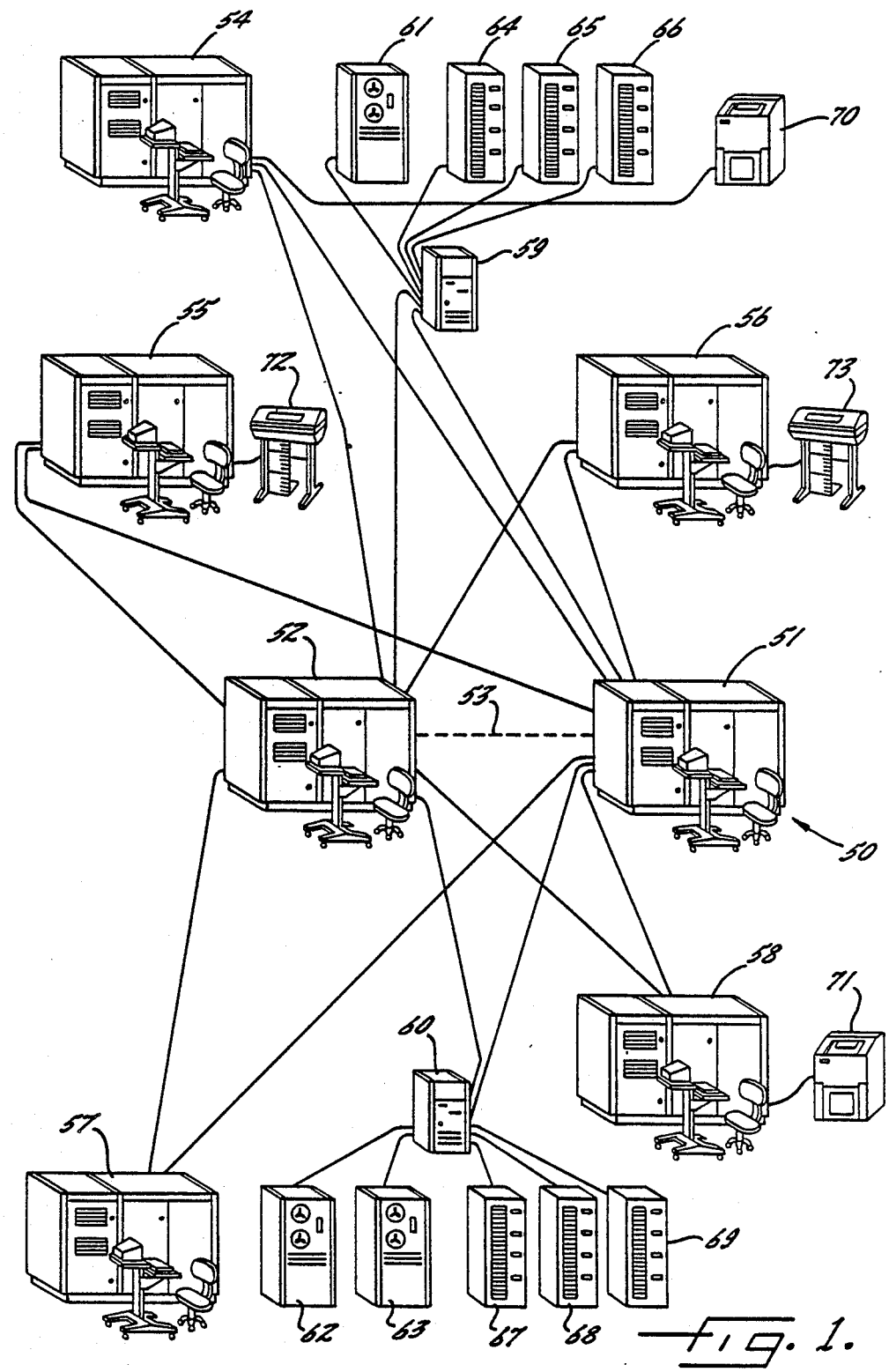
FIG. 1 is a pictorial diagram illustrating the use of a preferred embodiment of the present invention for interconnecting numerous conventional data processing devices.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to FIG. 1, there is shown a pictorial diagram illustrating the use of a computer interconnect coupler generally designated 50 which incorporates various aspects of the present invention. To provide enhanced reliability, the coupler 50 is comprised of two identical couplers 51 and 52 which are linked together, for example, by a fiber-optic link 53. The link 53 ensures that the configuration of the couplers 51 and 52 are maintained in identical states when the state is changed via an operator request received by either of the couplers 51, 52. The couplers 51, 52 may also use the link 53 to share information about the status and possible malfunctions of the numerous data processing devices which are interconnected by the couplers 51, 52. These data processing devices include central processing units 54, 55, 56, 57, 58 and servers 59, 60 for magnetic tape drives 61, 62, 63, and mass data storage or disk memories 64, 65, 66, 67, 68, 69. In the usual case, the central processing units 54–58 are linked directly to high-speed printers 70, 71 or low-speed printers 72, 73 and numerous timesharing terminals (not shown), communications devices (not shown), and application-specific devices (not shown).

The computer interconnect couplers 51, 52 permit the data processing devices 54–60 to be located at different positions, for example, at opposite ends of a building. Moreover, the couplers 51 and 52 may permit any one of the data processing units in the system to send an addressed data packet to any other data processing unit in the system. Further, the couplers 51, 52 can be configured or programmed to enable message transmission from one data processing device to another only if the respective channels of the source data processing device and the destination data processing device are included respectively in the predefined source channel set and destination channel set associated with at least one "virtual star coupler" defined for the system. The computer interconnect couplers 51, 52 thereby may restrict access to certain of the data processing devices, may permit data transfer only in certain directions, and for security purposes may permit messages to be routed to certain of the data processing devices only if the messages first pass through other of the data processing devices.

In accordance with the specific embodiment shown in the following drawing figures, each of the couplers 51, 52 is a two-stage electronic crossbar switch which preferably provides eight independent interconnecting communication junctors. Preferably each junctor is bidirectional and conveys data at 70 megabits per second. Each coupler 51, 52 is preferably capable of interconnecting at least 64 channels. Preferably, the channels connected to the couplers 51, 52 can be logically divided into as many as eight virtual star couplers, and the data processing devices connected to the channels can be moved logically from one virtual star coupler to another without physical recabling.

Figure 2:
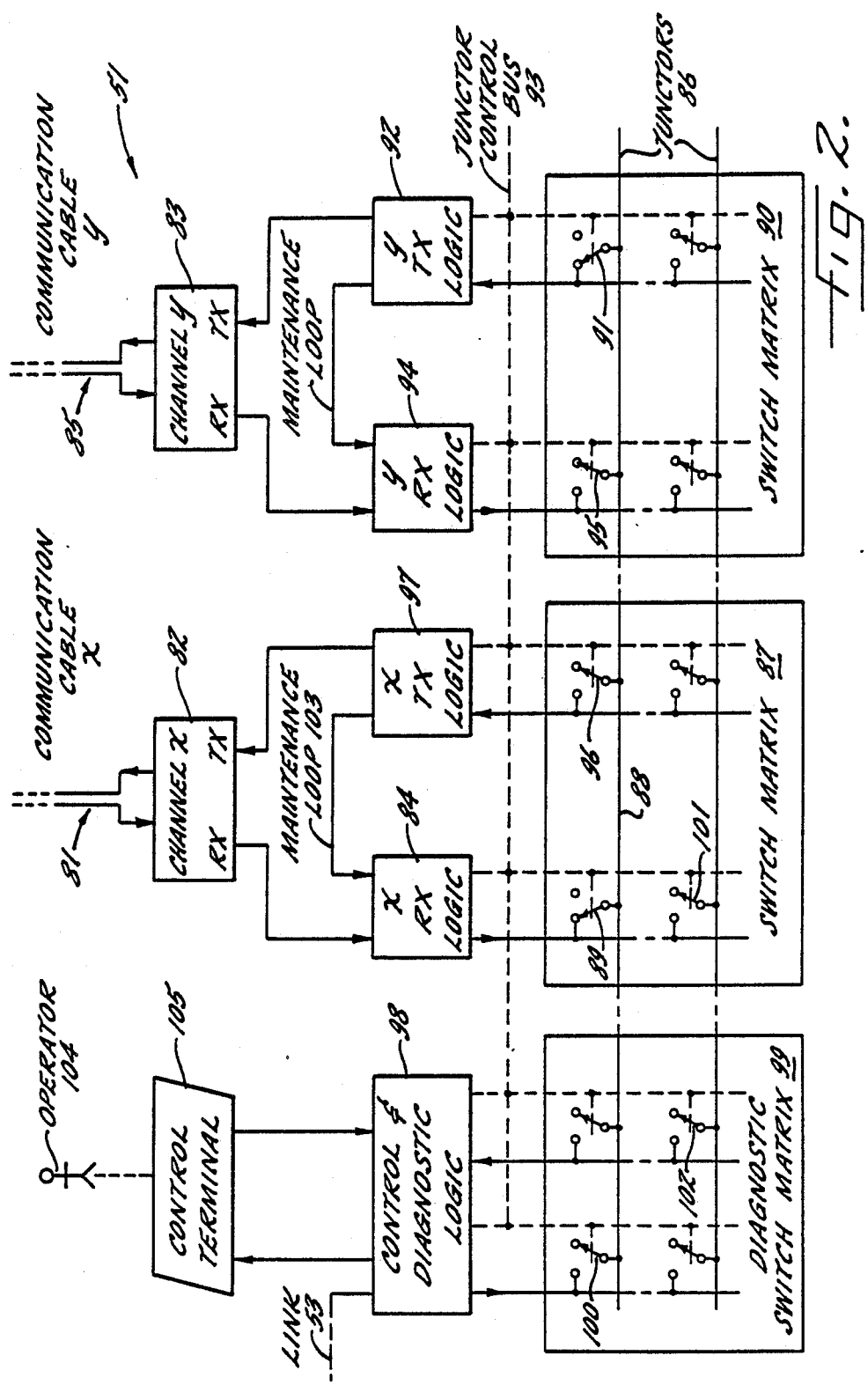
FIG. 2 is a schematic diagram illustrating how messages are routed over a junctor from a source channel to a destination channel, and further showing how internal messages are routed over junctors for diagnostic purposes.

Turning now to FIG. 2, there is shown a schematic diagram which illustrates the routing of a message from a source channel X to a destination channel Y. The channel X is defined by a communication cable 81 interconnecting interface circuits 82 to a data processing device at a remote location. Similarly, the channel Y has interface circuits 83 which are interconnected to another remote data processing device via a second communication cable 85.

For the sake of illustration, it is presumed that the interface circuits 82 for channel X receive via the communication cable 81 a message including a data packet addressed to channel Y. Therefore, for the purposes of this message, channel X is a source channel and channel Y is a destination channel. For processing such messages, each channel is assigned a unique channel number.

For routing the message, the beginning portion of the message is passed from the interface circuits 82 to receiver logic circuits 84. The receiver logic circuits 84 generate a routing request which, if satisfied, causes the assignment of one of a plurality of junctors 86 to the receiver logic circuits 84. The assignment causes a respective switch in a switch matrix 87 to close and connect the receiver logic circuits 84 to the assigned junctor. As shown in FIG. 2, for example, the receiver logic circuits 84 are connected to a junctor 88 by the closure of a switch 89.

The routing of a message to its addressed destination channel further requires the assigned junctor 88 to be connected to transmitter logic 92 associated with the destination channel. For this purpose the transmitter logic circuits 92 are connected to the junctors 86 by a switch matrix 90 including a switch 91 which becomes closed to connect the junctor 88 to the transmitter logic circuits 92. The required states of the switches in the switch matrices 87, 90 are set by control signals sent over a junctor control bus 93. Control signals are also received by the transmitter logic circuits 92 to indicate that a link has been established and that a message is being transmitted over one of the junctors 86. Upon receipt of the message, the transmitter logic 92 forwards the message to the channel interface circuits 83 for transmission over the communication cable 85 to the addressed data processing device.

Upon receipt of the message, the addressed data processing device returns an acknowledgment to the source data processing device. This acknowledgment is returned over the communication cable 85, passes through the interface circuits 83, and reaches associated receiver logic circuits 94. In anticipation of receiving the return acknowledgment when the receiver logic circuits 84 finish transmitting the original message, they cause a control signal to be generated over the junctor control bus 93 which opens the switches 89 and 91 and closes switches 95 and 96 to establish a reverse connection between the receiver logic circuits 94 associated with channel y and the transmitter logic circuits 97 associated with channel X. The return acknowledgment is passed by the transmitter logic circuits 97 to the interface circuits 82 associated with channel X for return to the data processing unit which initially sent the message.

In order to test the circuits in the interconnect coupler 51, the interconnect coupler further includes control and diagnostic logic 98 which is capable of originating control signals which are passed over the junctor control bus 93 to establish a "maintenance loop" through the receiver and transmitter logic of a selected one of the channels. The control and diagnostic logic 98 generates a diagnostic message which is applied to one of the junctors 86 via a diagnostic switch matrix 99. For this purpose, for example, the switches 89, 91 and 95 are opened and the switch 96 is closed. Moreover, a switch 100 is closed to connect the control and diagnostic logic 98 to the junctor 88 and thereby establish a transmission path to the transmitter logic 97. The control and diagnostic logic 98 originates a control signal over the junctor control bus 93 for closing a switch 101 and a switch 102 to establish a return path from the receiver logic circuits 84 to the diagnostic logic 98. In addition, a complete internal circuit is closed by a maintenance loop 103 providing a signal path from the transmitter logic 97 to the receiver logic 84. The transmitter logic 97 and the receiver logic 84, for example, are disconnected from the interface circuits 82 and interconnected via the maintenance loop 103 whenever both the receiver logic 84 and the transmitter logic 97 are connected to the junctors 86 via the switch matrix 87. By comparing the transmitted diagnostic message with the received diagnostic message, the control and diagnostic logic 98 can detect errors in controlling the switch matrix 87 or improper operation of the switch matrix 87, the receiver logic 84 or the transmitter logic 97. Any such errors are reported to a system operator 104 via a control terminal 105.

Figure 3:
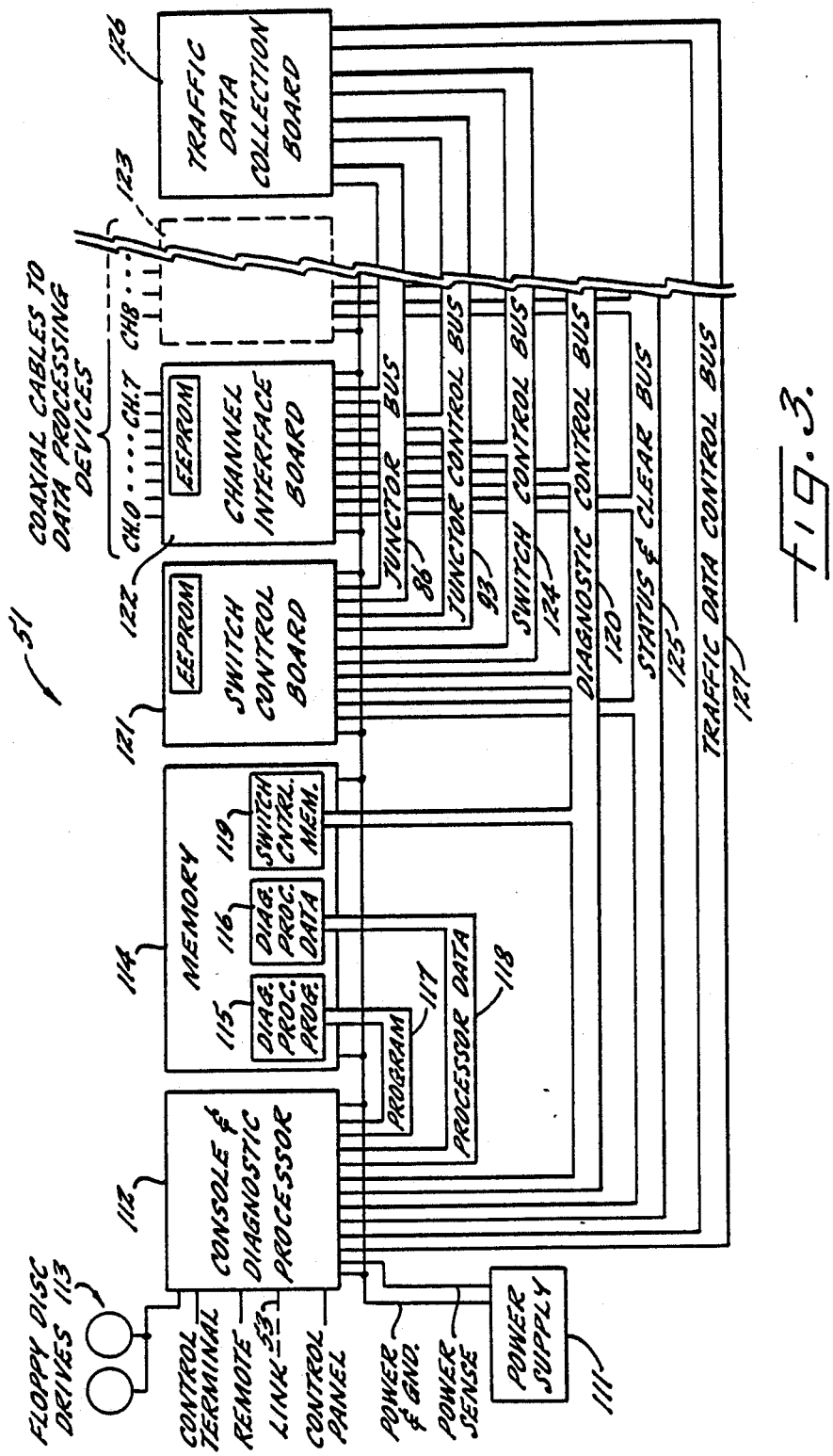
FIG. 3 is a schematic diagram showing the preferred way in which the circuits of the exemplary embodiment are arranged on circuit boards and how the circuit boards are interconnected by shared buses.

Turning now to FIG. 3, there is shown a diagram of various circuit boards which make up one of the interconnect couplers 51 or 52 of FIG. 1. The circuit boards are mounted in a conventional card cage of the kind used for a central processing unit, and the circuit boards are energized by a conventional power supply 111. In the exemplary embodiment, for example, the power supply, card cage, and an air blower are similar to those that are used for a Digital Equipment Corporation "VAX 8600/8650" central processor. The "back plane" of the card cage, however, is modified to interlink the circuit boards by a number of buses as shown in FIG. 3.

The exemplary computer interconnect switch generally designated 51 includes at least a circuit board 112 for a console and diagnostic processor which provides the control and diagnostic logic 98 shown in FIG. 2. The diagnostic processor 112 is, for example, a Digital Equipment Corporation "PDP-11" based processor. Associated with the diagnostic processor are a pair of floppy disc drives 113, the fiber-optic link 53, and links to the control terminal, an optional remote device, and a control panel. The diagnostic processor 112 also has associated with it a memory board 114 which includes a program memory 115 and a data memory 116 for the diagnostic processor. A program bus 117 links the diagnostic processor to the program memory 115, and a processor data bus 118 links the diagnostic processor with the data memory 116.

In accordance with a feature of the present invention, the memory board 114 further includes switch control memory 119 which stores switch routing policy level information. This information includes, for example, a master copy of the definitions of virtual star couplers for the system, and may also include data defining the timing intervals for various timers which detect unusual or improper operating conditions for the logic circuits in the computer interconnect coupler. A diagnostic control bus 120 is provided for linking the switch control memory 119 with the diagnostic processor 112. The diagnostic control bus 120 is also used for permitting the diagnostic processor to download the policy level information to central switch logic which routes messages over selected junctors by controlling the switch matrices. The central switch logic is included on a switch control board 121 which also includes the diagnostic switch matrix (99 in FIG. 2). For downloading the policy level information and for setting up the diagnostic switch matrix, the diagnostic processor 112 can interrupt or send control commands to the central switch logic in order to address the memory and registers of the central switch logic, as will be further described below.

The diagnostic control bus 120 is also used to link the diagnostic processor 112 with electrically erasable and programmable memory (EEPROM) included on the switch control board 121 and channel interface boards 122, 123 for the purpose of writing diagnostic information to a faulty circuit board before the faulty circuit board is removed for repair. Therefore, the diagnostic information, such as the system state and configuration at the time the failure was detected and the error flags which led to the diagnosis, are carried with the defective circuit board to the repair facility. This ensures that a more complete repair will be made to the circuit board so that, when returned, there will be a greater likelihood that all of the faults on the circuit board will have been properly repaired. Along with the diagnostic information, the EEPROM for each board preferably includes board identification information, for example, the type or function performed by the circuit board, the board's serial number, the board's manufacturing date and location, and the repair history of the board.

To provide incremental expansion of the computer interconnect coupler 51 to accommodate any desired number of channels up to a certain maximum number, there is provided a channel interface board 122 for each of a certain number of data processing devices to be interconnected into the computer system. Preferably each channel interface board includes the interface circuits for eight channels along with the associated receiver logic, transmitter logic, and switch matrix circuits. The diagnostic switch matrix in the switch control board 121 is linked to the switch matrices in the channel interface board 122 via the junctors 86 which extend to the switch matrices in any other channel interface boards 123 which may be installed in the system. In order to set and reset the switches in the switch matrices, the switch control board 121 is linked to the channel interface boards 122, 123 via the junctor control bus 93.

In order for the channel interface boards 122, 123 to send routing or queuing requests to the central logic in the switch control board 121, they are linked via a switch control bus 124. The switch control bus 124 is also used for returning acknowledgment signals and sending flow control signals from the switch control board 121 to the channel interface boards 122, 123. Moreover, the channel interface boards 122, 123 are linked to the diagnostic control bus 120 to permit the diagnostic processor 112 to download information such as timer intervals to the receiver and transmitter logic, and also to permit the diagnostic processor to inquire as to the status of the counters and registers and the transmitter and receiver logic.

During the operation of the computer interconnect coupler, various warning or error conditions may be generated by the circuitry in the switch control board 121 and the channel interface boards 122, 123. To permit these conditions of interest to be quickly recognized by the diagnostic processor, the diagnostic control bus 120 includes a respective interrupt request line for the switch control board 121 and each of the channel interface boards. When the diagnostic processor 112 is interrupted, it addresses an error flag register on the board generating the interrupt request.

In order to facilitate the operation of the computer interconnect coupler as the circuit boards 121, 122, 123 are installed or removed, there is provided a separate status and clear bus 125 which enables the diagnostic processor to poll each of the slots in the card cage (not shown) to obtain information indicating whether a board is installed, and if so, the type of board and the channel numbers associated with the board. The status and clear bus, for example, includes a separate enable line and a separate clear line from the diagnostic processor 112 to each of the slots for the circuit boards. The enable lines are sequentially activated to enable the boards to transmit a status code along the status bus from a respective status register. The clear line permits the diagnostic processor to independently reset each of the circuit boards 121, 122, 123.

The computer interconnect coupler may further include a traffic data collection board 126 linked to the diagnostic processor 112 via a traffic data control bus 127. The traffic data collection board includes, for example, addressable counters which record the frequency of messages passed over each of the junctors and originating from or destined for each of the channels.

Figure 4:
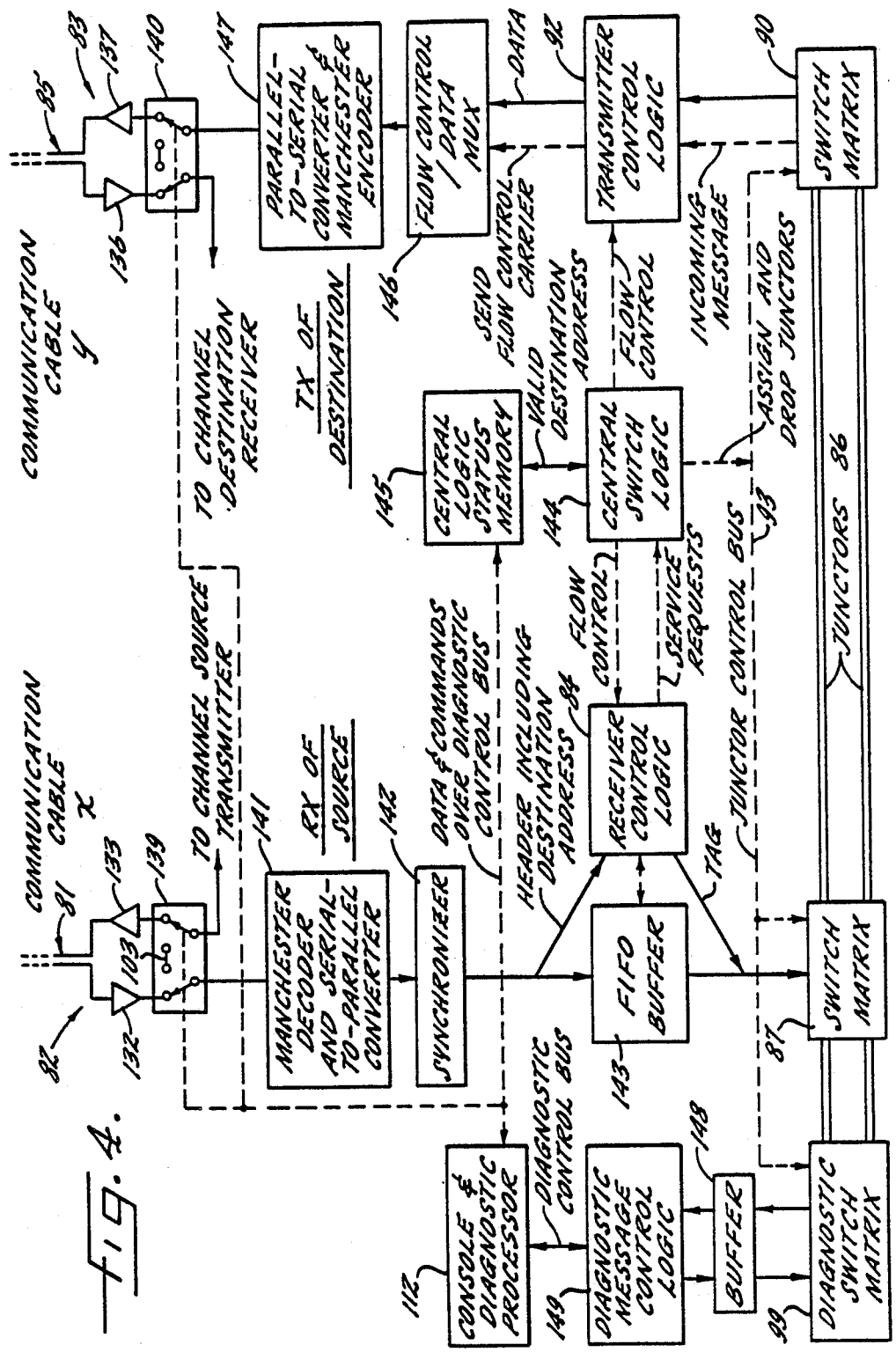
FIG. 4 is a functional block diagram illustrating the control paths which are used for routing a message from a source channel to a destination channel, and further showing the linkages between a diagnostic processor and the circuitry which routes the messages.

Turning now to FIG. 4, there is shown a functional block diagram of the computer interconnect coupler including the important control paths between the various circuit functions. The channel interface circuits 82 include a line receiver 132 and a line driver 133, which are coupled to the communication cable 81. The communications cable 81, for example, consists of a pair of coaxial cables connected respectively to the line receiver 132 and the line driver 133 via isolation transformers (not shown), or alternatively the communication cable could consist of a pair of fiber optic lines coupled to the line receiver 132 and line driver 133. In a similar fashion, the other channel interface circuits 83 include a line receiver 136 and line driver 137 coupled to the communication cable 85. The line receiver 132 and line driver 133 are connected to their respective receiver and transmitter logic circuits 84, 97 via a multiplexer 139 which can be switched to provide the maintenance loop 103. The other channel interface circuits 83 include a similar multiplexer 140.

The data transmitted and received on the communication cables 81, 85 are preferably transmitted as a serial bit stream using a self-modulated or self-clocking format such as Manchester encoding. The data rate, for example, is 70 megabits per second. The clock in the serial bit stream is recovered and the data bits are framed into eight-bit bytes by a Manchester decoder and serial-to-parallel converter 141. For ease of circuit design, a common internal clock is used to process the data from all of the channels. Therefore, a synchronizer 142 is used to selectively delay the data byte stream so as to synchronize the data bytes to the internal clock. The synchronized bytes are fed into a first-in-first-out buffer 143 to provide temporary storage during the routing of the message. The receiver control logic 84 obtains the destination address from the header of the message. The receiver control logic 84 also determines whether the header conforms to a predetermined format, and if so the receiver control logic sends a service request to the central switch logic 144 to route the message.

To permit the routing of messages only in accordance with predefined virtual star couplers, the central switch logic 144 in effect compares the destination address with a set of predetermined valid destination addresses defined for the source channel and stored in a central logic status memory. If the message is addressed to an impermissible address, the central switch logic 144 rejects the service request for routing the message. Otherwise, the central switch logic determines whether a junctor is free, and also determines whether the transmitter or receiver at the destination channel is busy. If a junctor is available and the destination is not busy, then the message is routed. Otherwise, a message routing request is placed in a "destination queue" so that the request may be satisfied when the destination channel is no longer busy.

When a message request is queued, the message in the buffer 143 cannot be transmitted and is discarded. Although it could be possible to provide sufficient storage to store an entire message until the message could be transmitted, this is not necessary and would require an excessive amount of memory and additional logic complexity. Moreover, the storage of an entire message for transmission at a later time reduces the integrity of the message transmission process since reception by the destination data processing device cannot be immediately acknowledged. In contrast, according to the preferred embodiment of the invention, only the beginning of a message is temporarily stored and therefore the acknowledgement of message reception is only slightly delayed and the computer interconnect coupler appears relatively transparent to the data processing devices.

In order to prevent the data processing device connected to the source channel from retransmitting the message when the message request is queued because the destination channel is busy, a responsive flow control signal is sent to the source channel to indicate to the receiver control logic 84 that the message has been queued. This flow control signal also activates the transmitter associated with the source channel to send a flow control signal back to the originating data processing device. Upon receipt, the flow control signal inhibits the data processing device from retransmitting until the central switch logic determines that the channel at the destination address is not conveying a message, and the queued message request appears at the head of the destination queue. When these conditions are satisfied, the central switch logic 144 turns the flow control signal off so that the data processing device of the source channel retransmits the message.

If the message routing request is queued because no junctor is available, no flow control signal is sent and the data processing device of the source channel is free to retransmit the message as soon as it is able to do so. When the central switch logic 144 is able to route the message, it sends a signal on the junctor control bus 93 to assign a free junctor to the source channel receiver and the destination channel transmitter. When the junctor is assigned, the respective switches in the switch matrices 87, 90 become closed, and the receiver control logic 84 and the transmitter control logic 92 are signalled that a message should be transmitted and received on the assigned junctor. Prior to transmission, the receiver control logic 84 adds a tag to the beginning of the message, and after the tag is transmitted over the assigned junctor, the message is clocked out of the buffer 143. The tag includes information identifying the assigned junctor, the source channel number and the destination channel number. The transmitter control logic 92 inspects the tag and prevents transmission of the message if the tag is incorrect. Otherwise, the tag is stripped off, and a bit synchronization header is added to the very beginning of the message. The message is then transmitted through a flow control and data multiplexer 146 and a parallel-to-serial converter and Manchester encoder 147 for transmission in serial form to the destination data processing device.

At the end of transmission of the message, the receiver control logic 84 senses that the buffer 143 is empty and sends a request to the central switch logic 144 to change the state of the switches in the switch matrices 87, 90 so as to reverse the data flow over the assigned junctor. Then, an acknowledgment from the destination data processing device is returned over the assigned junctor and transmitted to the source data processing device. After transmission of the acknowledgment, the assigned junctor is dropped.

Routing of a diagnostic message occurs in a similar fashion, except that the console and diagnostic processor 112 sends and receives the diagnostic message via a buffer 148 coupled to diagnostic message control logic 149 which includes transmit and receive logic.

Figure 5:
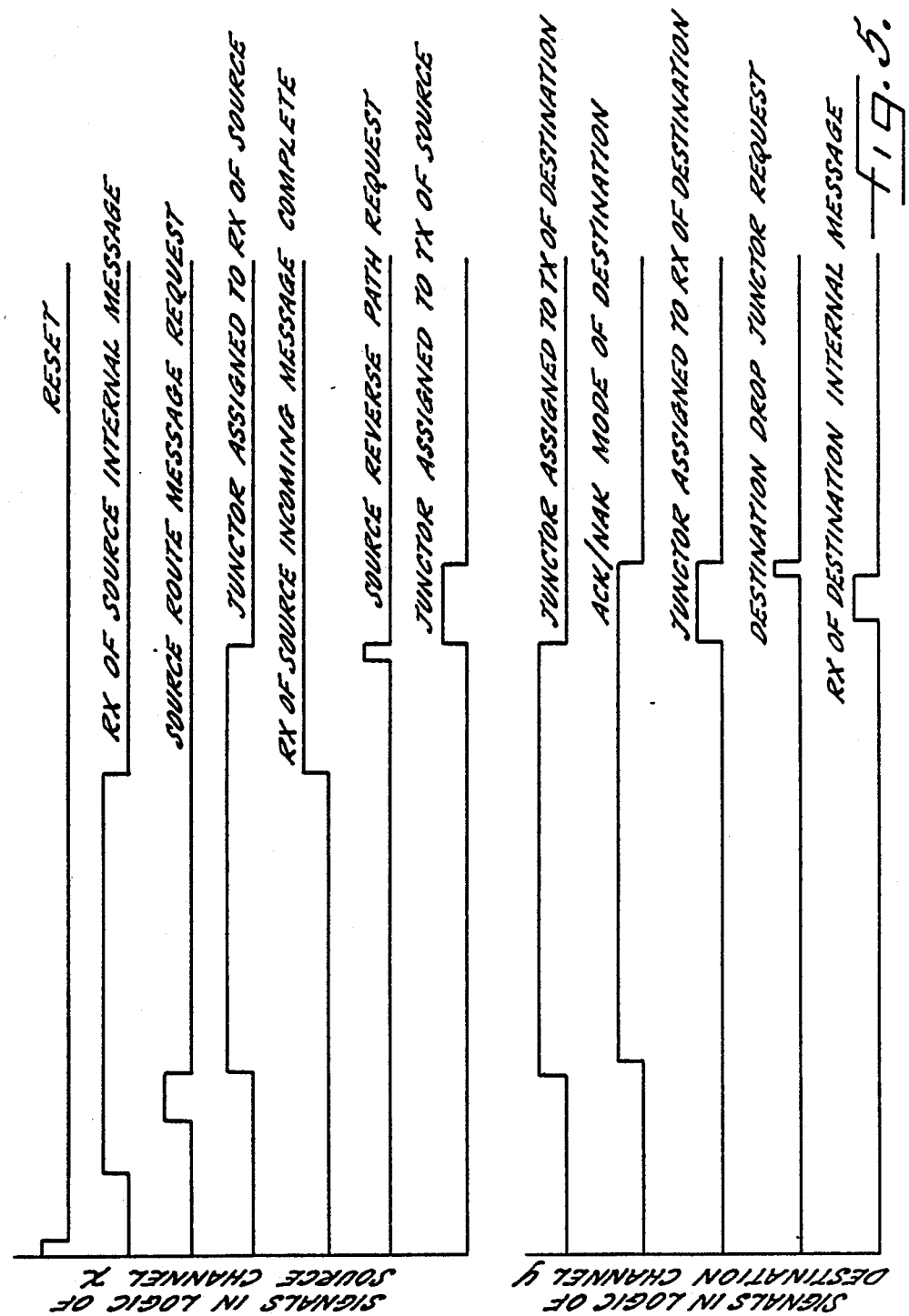
FIG. 5 is a timing diagram showing the successful routing of a message from a port of origin to a port of destination and the return of an acknowledgment code from the port of destination.

Turning now to FIG. 5, there is shown a timing diagram of the primary control signals which occur when a message is received and routed and a corresponding acknowledgment is returned. The computer interconnect coupler is set to an initial state by a RESET signal. After the RESET signal becomes inactive, the receiver of the source channel X searches for an incoming carrier from the communication cable 81. Upon finding a carrier, the receiver searches for a character sync code signalling the start of a message which is indicated by an INTERNAL MESSAGE signal. After the channel X receiver processes the initial portion of the message, it sends a ROUTE MESSAGE signal to the central switch logic. The central control logic responds by assigning a junctor to the channel X receiver as indicated by a JUNCTOR ASSIGNED signal.

From the time that the character sync code is received, the message is clocked into the buffer 143. As soon as the junctor is assigned, a prefixing tag is transmitted along the junctor and then the message is clocked out of the buffer 143. Transmission of the message through the junctor continues even after the entire message has been received by the channel X receiver, as indicated by the INCOMING MESSAGE COMPLETE signal. When the buffer 143 becomes empty, signalling that the entire message has been transmitted over the junctor, the channel X receiver sends a REVERSE PATH request to the central switch logic. Once the path along the junctor has been reversed, the channel X receiver has completed processing of the message.

As a result of reversing the path along the junctor, the junctor becomes assigned to the channel X transmitter, as indicated by the JUNCTOR ASSIGNED TO TX OF SOURCE signal. When the junctor is assigned to the channel X transmitter, the transmitter is activated, and the channel X receiver is inhibited from receiving further messages. In a similar fashion, during transmission of the message over the junctor from the channel X receiver to the channel Y transmitter, the channel Y transmitter is activated when the junctor is assigned to the channel Y transmitter.

The initial portion of the message transmitted over the junctor includes a header byte which includes a code indicating the type of the message. Upon receipt from the junctor, if the message is not a positive (ACK) or a negative (NAK) acknowledgment, the Y channel receiver and transmitter circuits are placed in an ACK-/NAK mode which indicates that after transmission of the signal, the channel Y receiver should expect an acknowledgment from the destination data processing device. In particular, it indicates to the channel Y receiver that for a certain time after the initial transmission of the message from the channel Y transmitter, the channel Y receiver is to expect an acknowledgment, and upon receipt of that acknowledgment the channel Y receiver need not request routing of the message because the previously assigned junctor will have been reserved for return transmission of the acknowledgment. The ACK/NAK mode also indicates to the Y channel receiver that upon completion of message processing, it is to send a DROP JUNCTOR request to the central logic instead of a REVERSE JUNCTOR request.

As shown in FIG. 5, the acknowledgment is indicated by the RX OF DESTINATION INTERNAL MES- SAGE signal of the channel Y receiver. The return message occurs sometime after the junctor is assigned to the channel Y receiver. Routing of the return acknowledgment is not required, and very shortly after the end of the message the channel Y receiver sends a DROP JUNCTOR request to the central switch logic. Once the processing of the message and the acknowledgment is finished, the junctor is dropped and the receiver circuits are returned to their initial state for receipt of further messages.

Figure 6:
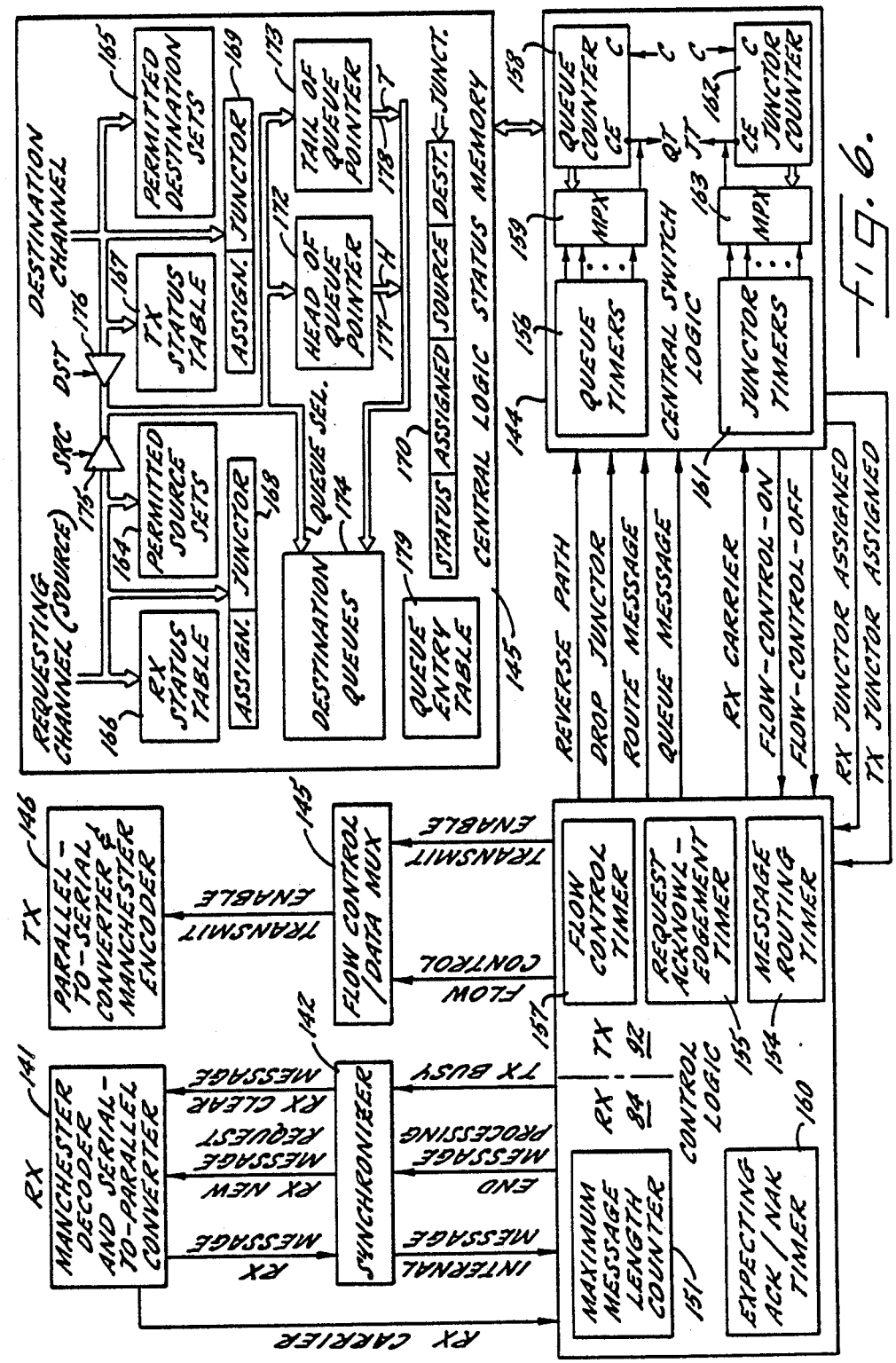
FIG. 6 is a functional block diagram showing in greater detail the control circuits, control signals, memory which stores the present logic state and configuration of the interconnect coupler, and various timers which sense abnormal operating conditions.

Turning now to FIG. 6, there is shown a functional block diagram of the control logic, control signals, control memory associated with the control logic, and various timers which insure that the control signals occur within certain predetermined time intervals.

For receiving a message, the synchronizer 142 sends a NEW MESSAGE REQUEST signal to the Manchester decoder and serial-to-parallel converter 141. The decoder and converter 141 respond by returning a RX MESSAGE signal which indicates that a message is being received. At certain other times, the synchronizer 142 sends a RX CLEAR MESSAGE signal to the decoder in order to inhibit the reception of a message. The RX MESSAGE signal is synchronized to an internal clock to send an INTERNAL MESSAGE signal to the receiver control logic 84. The receiver control logic 84 returns an END MESSAGE PROCESSING signal after processing a message, or when the length of the message exceeds a certain length as determined by a maximum message length counter 151. The receiver and transmitter control logic also sends a TX BUSY signal to the synchronizer 142 in order to inhibit the reception of a message when the transmitter control logic is busy, except when the control logic is in the loop back mode.

During message processing, the receiver control logic 84 sends a number of different requests to the central switch logic 144. These requests are grouped according to two separate levels of priority. The REVERSE PATH request and the DROP JUNCTOR request are high priority requests which respectively reverse the path along an assigned junctor, and drop an assigned junctor. The low priority requests include ROUTE MESSAGE, and QUEUE MESSAGE. The request ROUTE MESSAGE causes a junctor to be assigned if a junctor is available and if the destination port is not busy, and otherwise the message is recorded in the queue for the destination port. The request QUEUE MESSAGE causes a route message request to be placed in the queue for a specified destination port.

For routing a message, the central switch logic 144 refers to a central logic status memory 153 to determine the state of the computer interconnect coupler. In the preferred embodiment, the central logic status memory 153 resides with the central switch logic 144 on the switch control board (121 in FIG. 3). To prevent collisions between a routed message and a signal just being received by the receiver of the destination port, it is desirable for the central switch logic 144 to quickly poll the receiver of the destination port before completion of the routing process. Therefore, a control signal RX CARRIER originating in the Manchester decoder is transmitted from the receiver control logic to the central switch logic, in order to indicate that the receiver is busy.

Since the messages are received from the numerous channels on an asynchronous basis, the receiver control logic needs to know if and when the central switch logic 144 is able to successfully process the requests. The receiver control logic, for example, cannot transmit the temporarily stored message in the FIFO buffer 143 until the junctor has been assigned. Similarly, the transmitter control logic 92 needs to know whether a message has been successfully queued in order to transmit flow control, and further needs to know when a queued message request has reached the head of the respective destination queue, in which case the transmitter must turn off the flow control carrier. For these purposes, the receiver and transmitter control logic receives signals from the central switch logic 144 which indicate whether a junctor has been assigned or connected to the respective receiver or transmitter circuits, and also whether the flow control should be turned on or turned off. The assignment and dropping of junctors can be determined from signals which are passed over the junctor control bus. Additionally, processing of the REVERSE PATH, DROP JUNCTOR, and ROUTE MESSAGE requests can be confirmed by signals returned over the switch control bus 124 in (FIG. 3). The flow control is turned on and off by FLOW-CONTROL-ON and FLOW-CONTROL-OFF signals which are transmitted over the switch control bus.

If a message fails to be routed within a certain predetermined time interval, the FIFO buffer (143 in FIG. 4) of the respective channel receiver will overflow. To determine whether this condition will occur, the receiver control logic includes a message routing timer 154. If the message is not routed within the predetermined time interval, it is discarded, the ROUTE MESSAGE REQUEST is withdrawn, and a QUEUE MESSAGE request is sent to the central switch logic. At least one request acknowledgment timer 155 checks whether the central switch logic responds to the other service requests within a reasonable time interval.

After the transmission of a message and the reversal of the path along a junctor, the junctor is reserved for a certain period of time, while the receiver of the destination channel is in the ACK/NAK mode awaiting an acknowledgment. The receiver and transmitter control logic 84, 92 includes an expecting ACK/NAK timer which insures that the receiver control logic 84 will exit the ACK/NAK mode after a predetermined time interval, and also that the junctor assigned to the receiver control logic will be dropped. To further insure that this junctor will be dropped, the central switch logic 144 includes junctor timers 161 which expire when a junctor is assigned for more than a predetermined time limit. The central switch logic includes means for sensing the expiration of the junctor timers, for example, a junctor counter 162 and a multiplexer 163. When these circuits find an expired junctor timer, they generate a junctor timeout signal (JT) which causes a service junctor timer request (SJT) which is serviced by the central switch logic 144 to drop the respective junctor.

When a message request is queued, the flow control is turned on by the FLOW-CONTROL-ON signal. When the message request reaches the head of its respective destination queue, the destination channel is reserved for retransmission of the message. A set of queue timers 156 in the central switch logic insure that a destination is not reserved for an excessively long period of time. The beginning of the certain time period is signalled by the FLOW-CONTROL-OFF signal transmitted from the central switch logic 144 to the receiver and transmitter control logic 84, 92. To ensure that the flow control will be turned off when an unreasonably long time has passed, a flow control timer 157 is provided in the transmitter control logic 92. The transmitter control logic 92 further includes circuits which generate a FLOW CONTROL signal applied to the flow control/data multiplexer 145. Also, the transmitter control logic generates a TRANSMIT ENABLE signal which is passed through the flow control/data multiplexer 145 and on to the parallel-to-serial converter and Manchester encoder 146.

In accordance with an important aspect of the present invention, the FLOW CONTROL signal sent to the flow control/data multiplexer 145 is temporarily inhibited when an incoming message is routed over the junctors to the transmitter control logic 92. This incoming message (preceded by a gap or pause) is inserted into the carrier selected by the flow control/data multiplexer 145 in response to the FLOW CONTROL signal. Therefore, during the time that a data processing device is inhibited from sending a message, it is permitted to receive a message. Moreover, the flow control signal to that data processing device may resume after the reception of the incoming message and transmission of the corresponding ACK or NAK.

Once the receiver and transmitter control logic receives the FLOW-CONTROL-OFF signal and the flow control carrier has been turned off by the flow control/data multiplexer 145, the previously inhibited data processing device should retransmit its desired message within a certain time limit established by the queue timers 156. If not, the queue timer for the queue of the desired destination of the message will expire. The central switch logic 144 includes circuits such as a queue counter 158 and a multiplexer 159 which periodically scan the queue timers 156 and, upon finding an expired queue timer, generate a queue timeout signal (QT) which causes a service queue timer request (SQT). When processed by the central switch logic 144, the SQT request causes the message request at the head of the respective queue to be dropped from the queue so that the message request which is next in line in the queue will be serviced.

In order to rapidly process a service request, the central logic status memory 145 is organized so that the information required to process the request is very readily available. In order to determine whether a routing request is permitted by a predefined virtual star coupler, for example, the central logic status memory includes a permitted source sets memory 164 which is addressed using the number of the source channel which generated the ROUTE MESSAGE request, and the central logic status memory further includes a permitted destination sets memory 165 which is addressed using the destination channel number. The specific organization and use of the information stored in these memories is further described below in connection with FIGS. 10 and 11.

To enable the central switch logic 144 to determine the destination or source channel status associated respectively with a specified source or destination channel, the central logic status memory includes a RX status table 166, and a TX status table 167. In a similar fashion, there is provided a table 168 which indicates the junctor assigned to each source channel, and there is provided a table 169 which indicates the junctor assigned to each destination channel. In order to drop a junctor in response to a service junctor timer request, and also to readily indicate the states of the junctors, there is provided a junctor table 170 which is addressed by the junctor number. The junctor table specifies, for each junctor, whether that junctor is assigned and, if so, the source and destination to which the junctor is assigned. Also, the junctor table 170 includes a status entry which can be used to reserve a junctor, for example, for maintenance purposes.

To enable the central switch logic 144 to quickly place message requests on the destination queues, the central logic status memory has separate tables including a table 172 specifying respective pointers to the heads of the queues, and a table 173 specifying respective pointers to the tails of the queues. The outputs of the head and tail tables 172, 173 are multiplexed to the least significant address inputs of memory 174 where the destination queues are stored. Normally the most significant address inputs of the queue memory 174 and the queue pointer tables 172, and 173 are addressed by the number of the destination channel, although in one instance, as further described below, it is desirable to address the queue memory and tables by the source channel number. The selection of the source channel number or the destination channel number is provided by a pair of gates 175, 176. Similarly, the head or tail pointer is selected by a pair of gates 177, 178.

When queueing a message request, it is desirable for the central switch logic 144 to insure that a source channel number appears only once on a given destination queue. So that the central switch logic may rapidly determine whether or not any given source channel number is already stored in any given destination queue, there is provided a queue entry table 179 which includes a single bit entry for each combination of source and destination channel. In the preferred embodiment which includes 64 channels, for example, the queue entry table 179 is organized as a 64×64 single bit matrix. A respective bit is set whenever a message request is placed on the queue, and a respective bit is cleared when a message request is taken off the queue.

Figure 7:
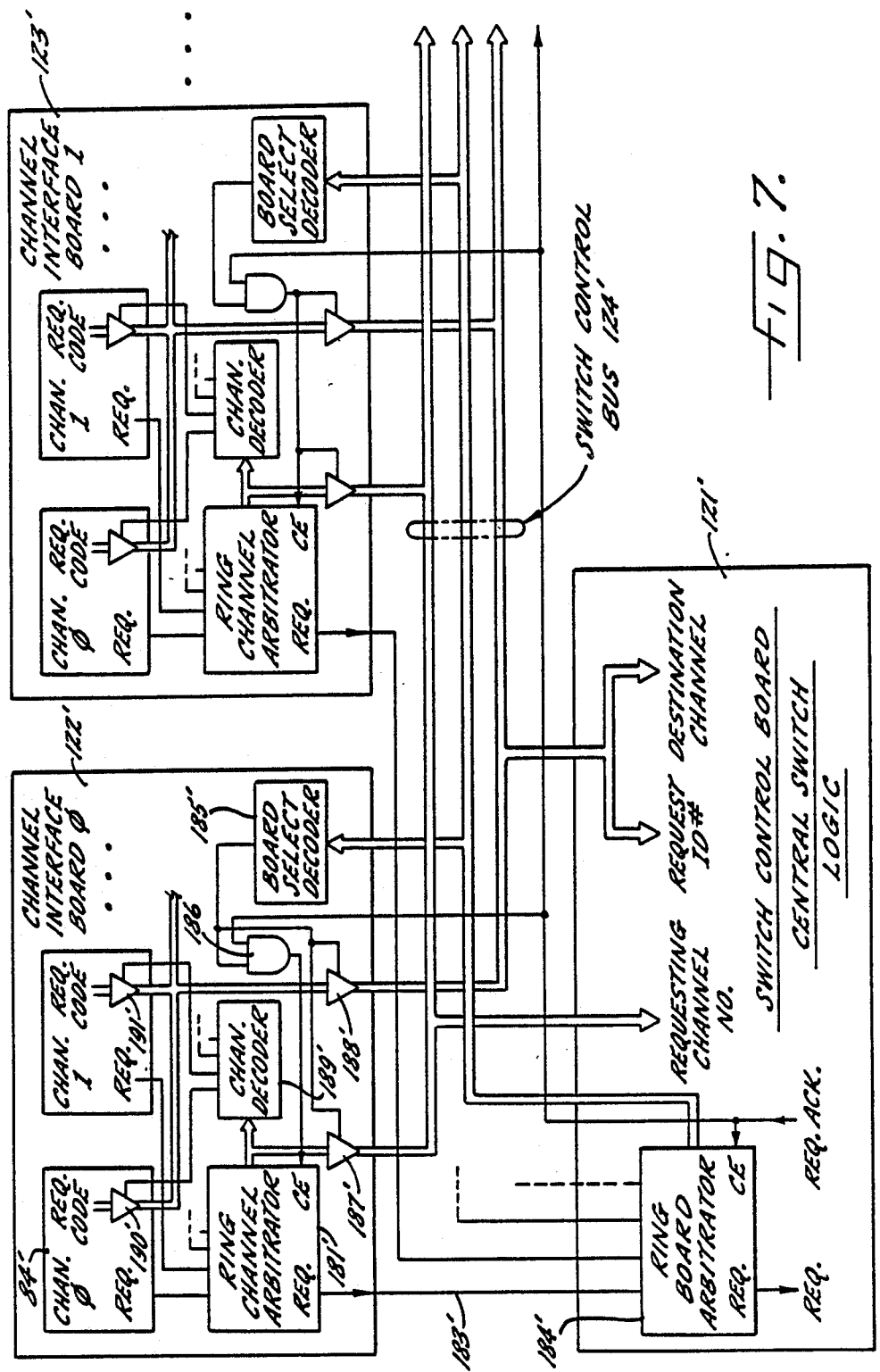
FIG. 7 is a schematic diagram illustrating a hierarchical rotating priority arbitration scheme in which the service requests have the same level of priority.
Figure 8:
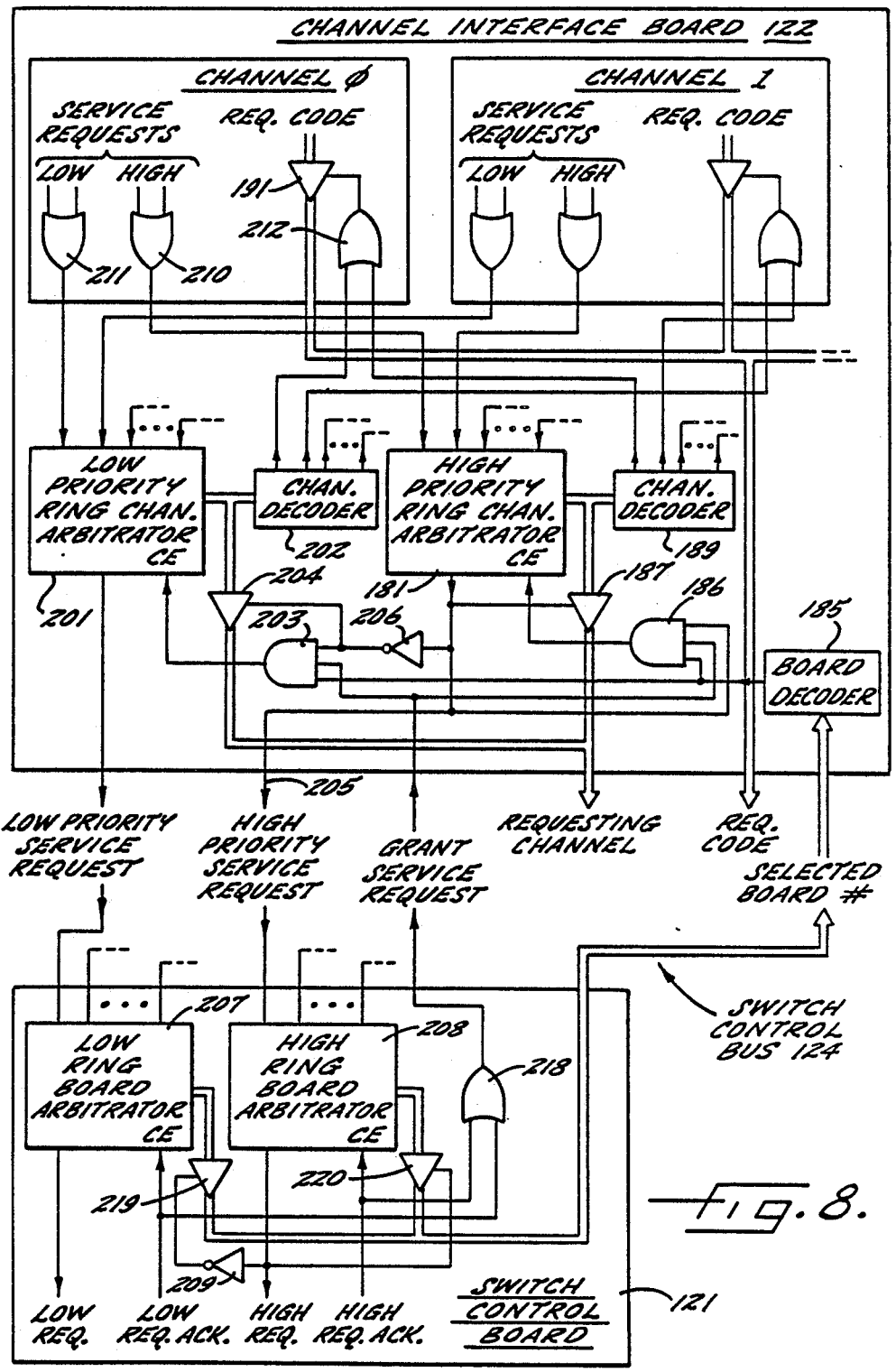
FIG. 8 is a schematic diagram showing logic circuits for implementing a dual level priority scheme in which service requests are grouped into a set of high priority requests and low priority requests, and in which separate arbitration circuits are provided for arbitrating simultaneous requests occurring within each group.

Turning now to FIG. 7, there is shown a diagram illustrating a hierarchical rotating arbitration circuit which is advantageously employed for arbitrating simultaneous service requests fed from the receiver and transmitter control logic to the central switch logic. FIG. 7 is a simplified circuit and it should be understood that the alternative shown in FIG. 8 is preferred. As shown in FIG. 7, for example, each channel interface board 122', 123' includes a respective ring channel arbitrator 181' which selects a service request from a particular one of the respective receiver logic circuits 84' associated with each channel of the channel interface board. Moreover, each Channel interface board 122', 123' has a respective request line 183' connecting the respective ring channel arbitrator 181' to a ring board arbitrator 184' on the switch control board 121'. The ring board arbitrator 184' selects the request from a particular one of the ring channel arbitrator circuits 181' and passes that request to the central switch logic to be serviced. The ring board arbitrator also transmits the board number of the selected board over the switch control bus 124' and applies it to a board select decoder 185' provided on each of the channel interface boards 122', 123'. The board select decoder 185' recognizes a particular board number selected by the ring board arbitrator 184' and generates a signal which enables gates 186', 187', 188' which pass the channel number selected by the ring channel arbitrator 181'. As further selected by a channel decoder 189' and gates 190', 191', a request code from the receiver logic of the selected channel of the selected board is passed over the switch control bus 124' to the switch control board 121'. The request code, for example, includes a request identification number identifying the particular service request and a number identifying the destination channel associated with a route message or a queue message service request.

An important advantage of the hierarchical arbitration circuit of FIG. 7 is that additional channel interface boards can be installed without modification to either the ring board arbitrator 184' on the switch control board 121' or to the ring channel arbitrators 181' on the other channel interface boards 122', 123'. When a channel interface board is removed, for example, its associated request line 183' goes low so that no request is presented to the ring board arbitrator 184'. Consequently, the ring board arbitrator 184' merely skips the missing board when arbitrating among the requests from the channel interface boards installed in the computer interconnect coupler. As shown in FIG. 7, for example, each acknowledgment of a request causes the ring board arbitrator and the respective ring channel arbitrator to be advanced to the next active requests. Specifically, a request acknowledge signal (REQ. ACK.) functions as a "service grant" to enable the ring board arbitrator 184' and the ring channel arbitrator 181' of the selected board to "clock" to select the next service request. In this regard, the clock enable inputs (CE) are preferably fully synchronous inputs and function in an analogous fashion to the data enable inputs of standard TTL part no. 74173; in other words, when the clock enable input (CE) is low, the synchronous logic circuits do not change state due to selective feedback, even though the registers in the logic circuits are clocked.

Another advantage to the hierarchical priority scheme of FIG. 7 is that the overall arbitration logic is relatively simple, and the arbitration logic is merely duplicated for the channel interface boards 122', 123'. Moreover, the circuitry for the ring board arbitrator 184' is substantially the same as the circuitry for the ring channel arbitrators 181.

Turning now to FIG. 8, the preferred channel interface board 122 is shown in greater detail, including a second ring channel arbitrator 201 for arbitrating low priority requests from the receiver logic circuits 84. In accordance with an important aspect of the present invention, the service requests are grouped into low priority requests and high priority requests, and separate ring arbitrators are provided for arbitrating the requests within each priority group. Associated with the low priority ring channel arbitrator 201, for example, is a channel decoder 202 and gates 203, 204 which operate in conjunction with the gates 186, 187 for selecting either the channel number provided by the low priority ring channel arbitrator 201, or the channel number provided by the high priority ring channel arbitrator 181.

The high priority service request signal in a line 205 is fed to an inverter 206 to enable either the gates 203, 204 or the gates 186, 187 when the board select decoder 185 is enabled. In other words, when a service request from a board is granted, and both high and low priority requests are present, the requesting channel fed back to the central board arbitrators will be the channel of the high priority request.

As further shown in FIG. 8, the low priority requests from the low priority ring channel arbitrators are fed to a low priority ring board arbitrator 207 on the switch control board 121, and the high priority requests from the high priority ring channel arbitrators are fed to a high priority ring board arbitrator 208 also on the switch control board 121. An OR gate 218 combines a HIGH REQ. ACK. signal and a LOW REQ. ACK. signal to provide a GRANT SERVICE REQUEST signal for the channel interface boards 122, 123. The board select number of the channel being granted priority is provided by an enabled one of two tristate gates 219, 220. The gate 219 is disabled by the HIGH REQ. output of the high ring board arbitrator 208, and the gate 22 is enabled by this HIGH REQ. output.

The reverse path request and the drop junctor request are preferably grouped together as high priority requests, and the route message and queue message requests are grouped together as low priority requests. In the receiver channel logic 84, the high priority requests are combined by an OR gate 210, and the low priority requests are combined by an OR gate 211.

Figure 9:
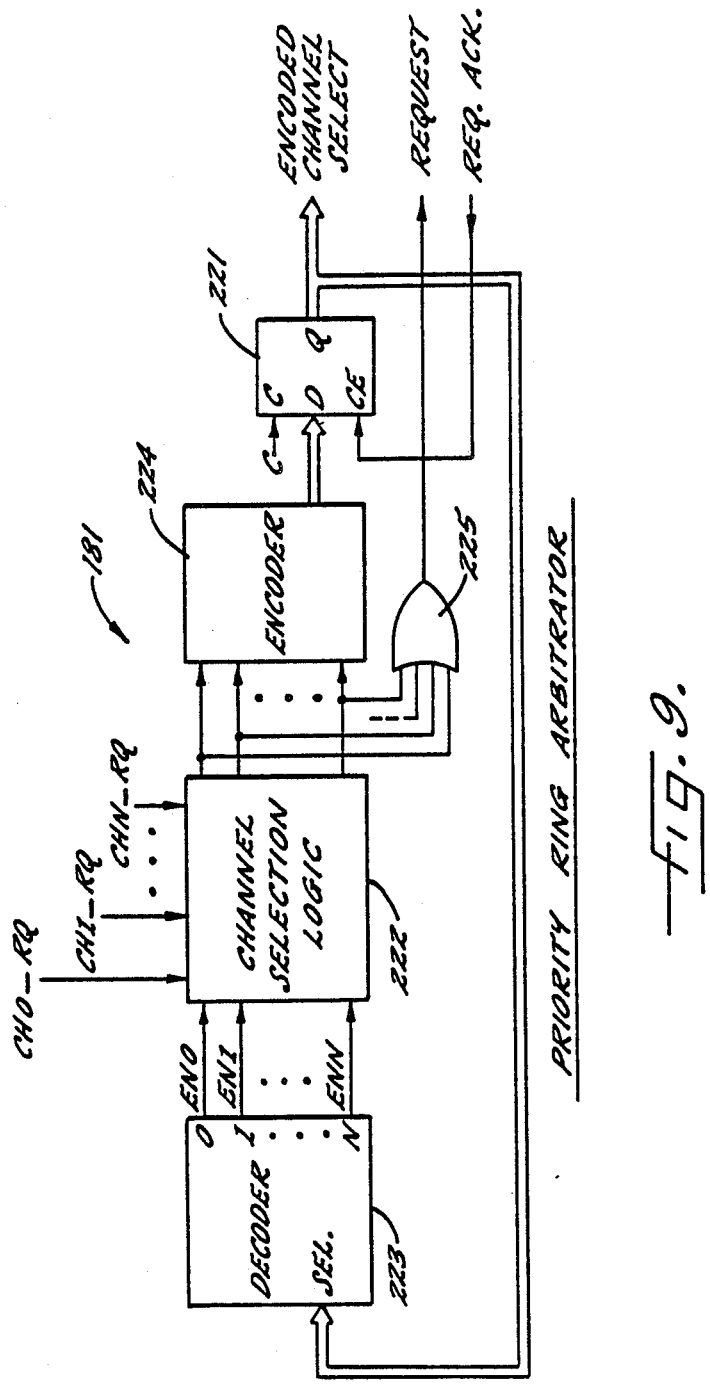
FIG. 9 is a schematic diagram of a priority ring encoder.

Turning now to FIG. 9, there is shown a schematic diagram of the preferred organization of a ring channel arbitrator 181. Substantially the same circuit is used for the ring board arbitrator 184 in the central switch logic. The ring arbitrator includes a register 221 which stores the number of the channel last given priority. The channel to be given priority next is determined by channel selection logic 222. To simplify the implementation of this channel selection logic by using a programmable logic array, the channel selection logic receives the outputs of a channel decoder 223, and generates individual channel select outputs which are fed to an encoder 224 which provides the encoded channel number of the next channel to be given priority. The logical equations for the channel selection logic 222 are included in APPENDIX I. In addition to receiving channel select signals from the decoder 223, the channel selection logic 222 also receives the individual requests from the channels associated with its respective channel interface board. The outputs of the channel selection logic 222, each of which indicates whether priority is to be given next to a respective channel, are combined in a logical OR gate 225 to indicate whether a request is being presented by any of the channels.

Figure 10:
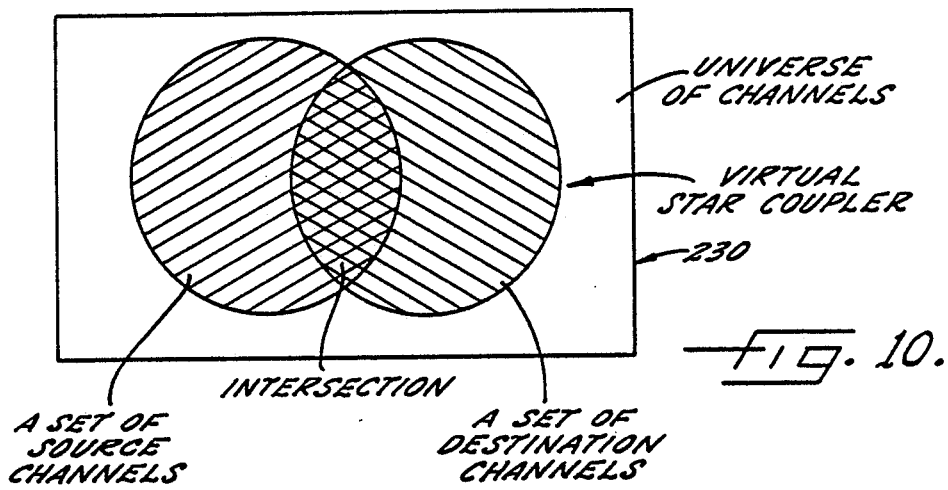
FIG. 10 is a Venn diagram showing how a virtual star coupler is defined as a set of source channels associated with a set of destination channels.

Turning now to FIG. 10, there is shown a Venn diagram generally designated 230 which illustrates the definition of a virtual star coupler as a predefined set of source channels associated with a respective set of destination channels. As shown in FIG. 10, the set of source channels may intersect with the set of destination channels. In this case, the channels in the intersection may freely communicate with each other. Otherwise, the message transmission between the channels may only proceed from the source channels to the destination channels. Preferably a number of such virtual star couplers can be defined for the computer interconnect coupler. Any given channel may be included in more than one of the virtual star couplers.

Figure 11:
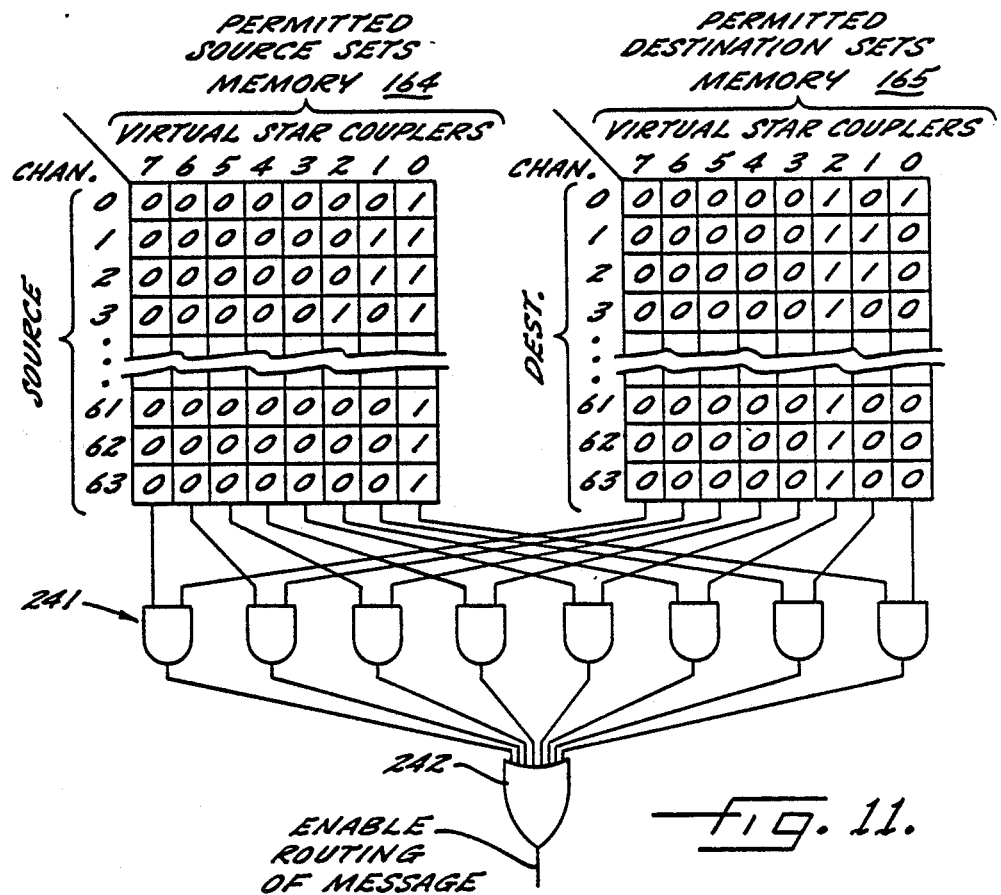
FIG. 11 shows the memory and logic circuits which store definitions for up to eight virtual star couplers and which generate a signal for enabling the routing of a message from a specified source channel to a specified destination channel.

Turning now to FIG. 11, there is shown the preferred manner of representing the virtual star couplers in the permitted source sets memory 164 and the permitted destination sets memory 165. The permitted source sets memory 164 includes 64 bytes which are addressed by the channel numbers 0 to 63. Each bit position in each of the bytes is a logical 1 or 0 to represent whether or not the source channel addressing the byte is included in a virtual star coupler for the respective bit position. The permitted destination sets memory 165 similarly is organized as a set of 64 bytes wherein each bit of the byte is a logical 1 or 0 to indicate whether or not the destination channel number addressing the byte is included in the virtual star coupler represented by each respective bit position.

In order to determine whether a message from a specified source channel can be permissibly routed to a specified destination channel, the respective bit output lines of the permitted source sets memory 164 are logically ANDed with the respective bit outputs of the permitted destination sets memory 165 using logical AND gates 241. Therefore, each gate has an output indicating whether the specified source and destination are found in the respective source channel set and destination channel set for a respective one of the eight possible virtual couplers which can be defined for the computer interconnect coupler. Since the message should be routed if routing is permitted through any one of the eight virtual star couplers, the outputs of the AND gates 241 are combined in a logical OR gate 242 to provide the signal to enable the routing of the message.

By way of example, the programming for the permitted source sets memory 164 and the permitted destination sets memory 165 have been shown in FIG. 11 to illustrate the specific cases of a virtual star coupler to permit a device to only receive messages, to only transmit messages, and to exchange messages among a small selected group of the channels. The virtual star coupler defined for the 0 bit position includes logical ones for all of the source channels in the permitted source sets memory 164, but has a logical one only in the 0 bit position for the 0 destination channel number. Therefore, the virtual star coupler defined for the 0 bit position enables the data processing device connected to channel 0 to be used only for receiving data.

The virtual star coupler defined by the second bit position has logical ones only for both the source channels 1 and 2 and the destination channels 1 and 2. Therefore, this virtual star coupler couples together channels 1 and 2 for data exchange in either direction between themselves. Virtual star couplers of this kind can be defined for respective storage servers in order to balance their respective access loads. Virtual star couplers of this kind can also be defined to enable flexibly locating or logically moving central processor resources from one coupled group of processors to another. The virtual star coupler associated with the bit 2 position includes a logical one for only the source channel 3 but provides logical ones for all of the destination channels. Therefore, this virtual star coupler associated with bit 2 defines the data processing device connected to source channel 3 as capable of only transmitting data to the other data processing devices.

Figure 12:
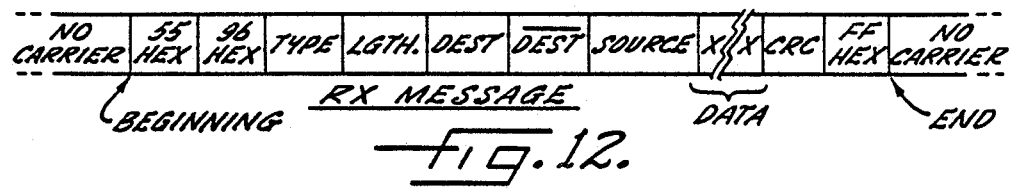
FIG. 12 is an example of a specific format for a message transmitted through the computer interconnect coupler.

Turning now to FIG. 12, there is shown a preferred format for messages and acknowledgment. The messages and acknowledgments are asynchronously transmitted and are separated by intervals where carrier is absent from the channel conveying the message. Each message includes, in sequence, a header having the value of 55 hexadecimal for the purpose of facilitating bit synchronization, a character synchronization byte having the value of 96 hexadecimal for frame synchronization, a byte indicating whether a message or either a positive or negative acknowledgment (ACK/NAK) is being received, a byte indicating the length of the message, a byte indicating the desired destination channel number, a byte indicating the complement of the desired destination channel number, a byte indicating the source channel for the message, a number of data bytes as was previously specified by the length of the message, a cyclic redundancy check (CRC), and a trailer having a value of FF hexadecimal. It should be noted that the format for the positive and negative acknowledgments (ACK/NAK) is similar to the form shown in FIG. 12, except that in such a case the byte indicating the length of the message is omitted, and the data are also omitted.

Figure 13:
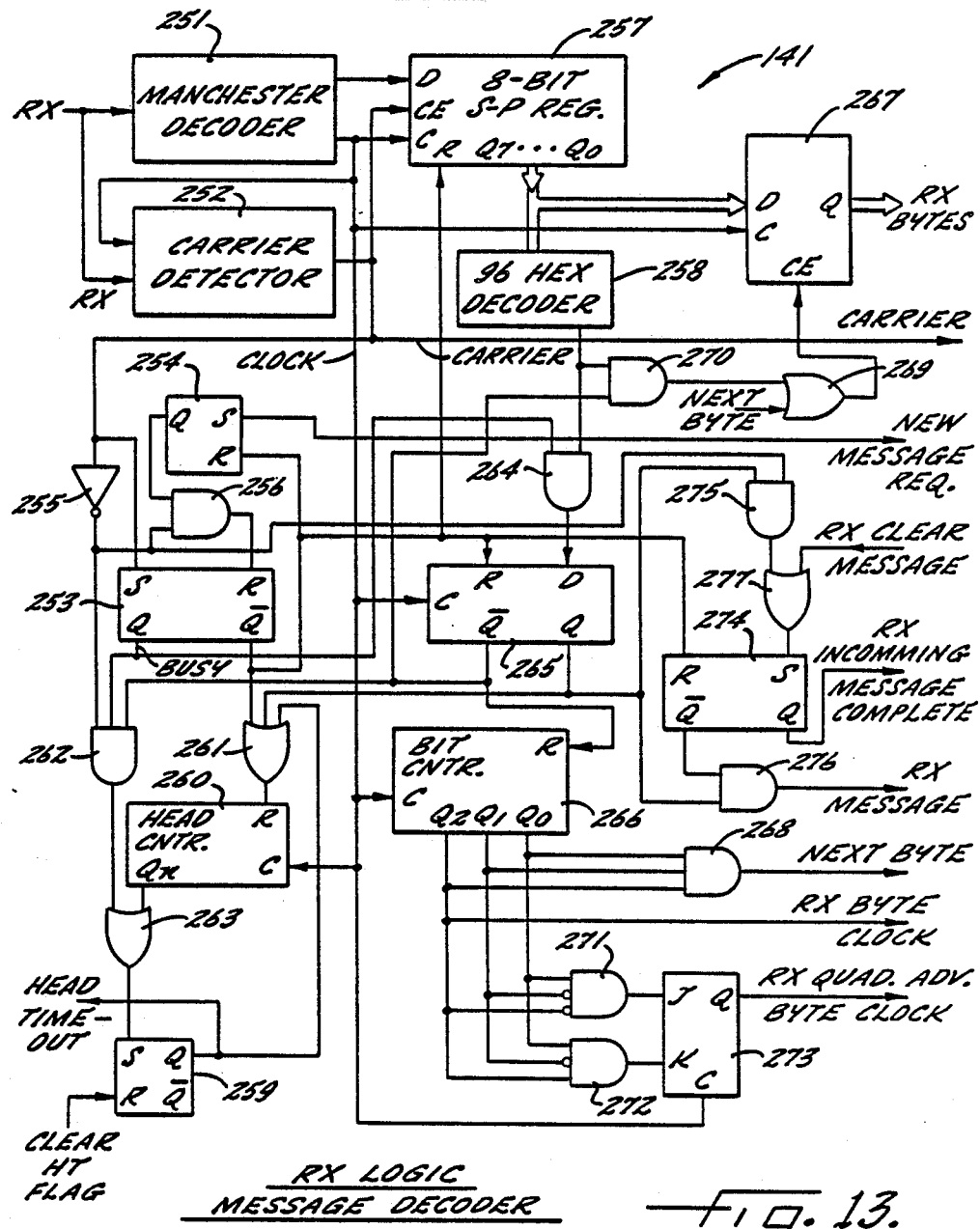
FIG. 13 is a schematic diagram of a Manchester decoder and serial-to-parallel converter with carrier detection logic.

Turning now to FIG. 13, there is shown a schematic diagram of receiver logic for initially detecting a message according to the message format shown in FIG. 12. The message transmitted from a data processing device is received in a Manchester decoder 251 and a carrier detector 252, as further described in Stuart U.S. Pat. No. 4,592,072, herein incorporated by reference. The message decoder in FIG. 13 may be in one of two primary states, as determined by a flip-flop 253. The message decoder enters the idle state when reset in response to a NEW MESSAGE REQ. signal and when carrier fails to be detected by the carrier detector 252. For this purpose the flip-flop 253 is set by the presence of the carrier, and is reset in the absence of carrier by a flip-flop 254, an inverter 255, and a gate 256.

When the message decoder of FIG. 13 leaves the idle state and becomes busy in the presence of a carrier, the decoded data in serial form from the Manchester decoder 251 is clocked into a serial-to-parallel converter register 257. As the data is clocked into the serial-to-parallel converter 257, a header timer interval is monitored while the message decoder waits for the character synchronization value of 96 hexadecimal. The presence of this character sync is detected by a decoder 258. If carrier disappears or the header timeout interval expires before the sync character is detected, a header timeout flag is signalled by a flip-flop 259. The timing interval is determined by a counter 260, which is reset by an OR gate 261 when the message decoder is idle, when the sync character is detected, or when the header timeout flag becomes set. Disappearance of the carrier during this header timeout interval is detected by an AND gate 262, and the two conditions for setting the header timeout flag are combined in an OR gate 263.

To signal the presence of a message when the sync character is found after the message decoder becomes busy, an AND gate 264 sets a flip-flop 265. When this flip-flop becomes set, a 3-bit binary counter 266 begins to count to generate a clock for the bytes which appear in the serial-to-parallel converter register 257. The frame synchronized bytes are strobed into an output register 267 when the counter 266 reaches a value of seven, as detected by an AND gate 268. In order that the frame synchronization code is also received in the output register 267, an OR gate 269 combines the NEXT BYTE signal with the output of an AND gate 270 to generate a clock enable signal for the output register 267. A byte clock for the bytes which appear from the output register 267 is provided by the output $Q_2$ of the 3-bit binary counter 266. In order to synchronize the data from the output register 267 to an internal clock, a pair of gates 271, 272 and a flip-flop 273 are used to generate a quadrature byte clock that is advanced with respect to the output $Q_2$ of the 3-bit binary counter 266.

For processing the incoming messages, it is desirable to operate the message decoder in a hand-shake mode in which the message decoder recognizes a message only after the decoder has received a NEW MESSAGE REQ. so that one message can be fully processed before another message will be recognized by the decoder. For this purpose, the end of a message is detected by a flip-flop 274 which becomes set when the flip-flop 265 is set and carrier is lost, as detected by an AND gate 275. The flip-flop 274 therefore generates an INCOMING MESSAGE COMPLETE signal. An AND gate 276 combines the Q output of the flip-flop 265 with the Q complement output of the flip-flop 274 in order to provide a MESSAGE signal which is high during the occurrence of a message.

At certain times during the operation of the computer interconnect coupler of the present invention, it is desirable to inhibit or clear the message decoder of incoming messages. This should be done, for example, when a channel transmitter is activated so that an incoming message simultaneous with it will not cause flags to be set when the incoming message is finished. For this purpose the message decoder includes an OR gate 276 receiving a CLEAR MESSAGE signal for setting the flip-flop 273, and thereby forcing the MESSAGE signal low until the CLEAR MESSAGE signal is removed and thereafter the carrier becomes absent.

Figure 14:
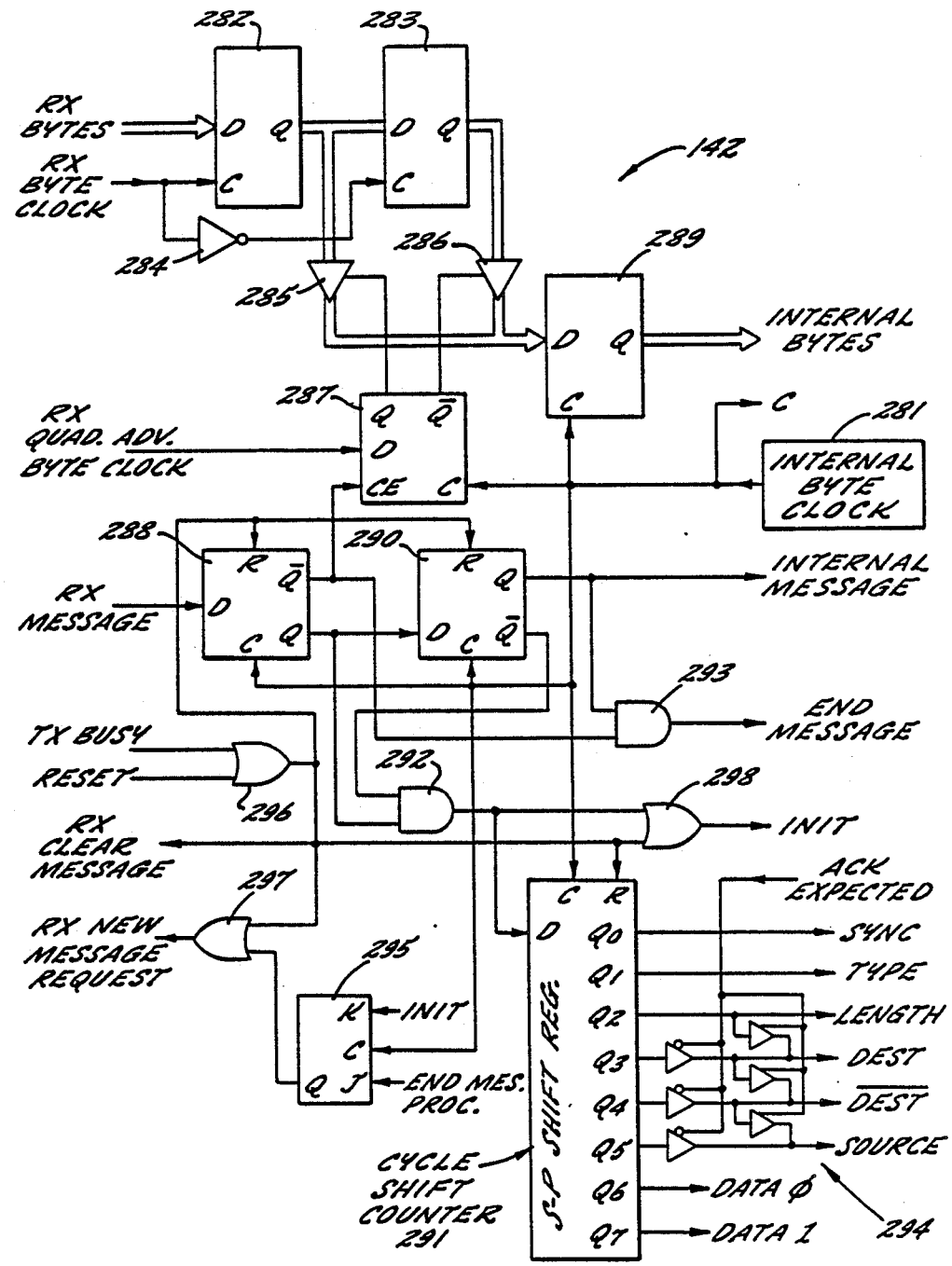
FIG. 14 is a schematic diagram of a message synchronizer and a cycle counter, for receiver control logic.

Turning now to FIG. 14, there is shown a schematic diagram of a message synchronizer and a cycle counter for the channel receiver logic. In order to synchronize the received data bytes to an internal byte clock 281, there are provided a pair of registers 282 and 283 which are clocked with a phase difference of 180° of the byte clock, as provided by an inverter 284. For messages having a certain limited duration corresponding to the maximum permitted message length, the outputs of one of these two registers 282, 283 can be selected by a respective one of two gates 285, 286 to provide data synchronized to the internal byte clock 281. To determine which of these two gates should be enabled, a flip-flop 287 clocked by the internal byte clock 281 samples the quadrature advanced byte clock from the message decoder of FIG. 13. Moreover, this decision is held for the duration of the message, by enabling the delay flip-flop 287 only in the absence of the MESSAGE signal. A delay flip-flop 288 provides a necessary delay for disabling the clock to the flip-flop 287. So that the bytes are precisely synchronized to the internal byte clock, there is provided an output register 289 clocked by the internal byte clock 281. A delay flip-flop 290 provides an INTERNAL MESSAGE signal which indicates when the bytes presented by the flip-flop 289 represent bytes from a received message.

In order to identify each individual byte in the message format of FIG. 12, a shift register cycle counter 291 provides a respective strobe signal when the respective bytes appear at the output of the output register 289. This shift register cycle counter receives an initial pulse provided by an AND gate 292 which detects the leading edge of the INTERNAL MESSAGE signal. Similarly, an AND gate 293 provides an END MESSAGE signal at the trailing edge of the INTERNAL MESSAGE signal.

It should be recalled that the format of FIG. 12 is the format for a message, and the format for a return acknowledgment code is similar except that the LENGTH byte is missing. To permit the cycle shift counter 291 to be used for decoding bytes for both messages and acknowledgments, there is provided a multiplexer generally designated 294 which shifts the positions of the strobe pulses for the DEST, DEST complement, SOURCE strobe signals when an acknowledgment is expected by the channel receiver logic.

Also shown in FIG. 14 is logic for providing the hand-shake and message clearing signals to the message decoder of FIG. 13. A flip-flop 295 provides a NEW MESSAGE REQUEST signal in the usual case at the end of message processing. In response to a system RESET signal, or during the time that the channel transmitter is busy, any current message should be cleared and a new message should be requested. For this purpose, an OR gate 296 combines a system RESET signal and a TX BUSY signal to generate the CLEAR MESSAGE signal to the channel receiver. Also, a second OR gate 297 combines this CLEAR MESSAGE signal with the output of the flip-flop 295 to generate the NEW MESSAGE REQUEST signal returned to the channel receiver of FIG. 13. Still another OR gate 298 is used to combine the CLEAR MESSAGE signal with the output of the AND gate 292 to provide an INIT signal for the channel receiver logic, so that the channel receiver logic becomes reset whenever the channel transmitter is busy or a system RESET occurs, or just before a detected message appears at the output of the output register 289.

Figure 15:
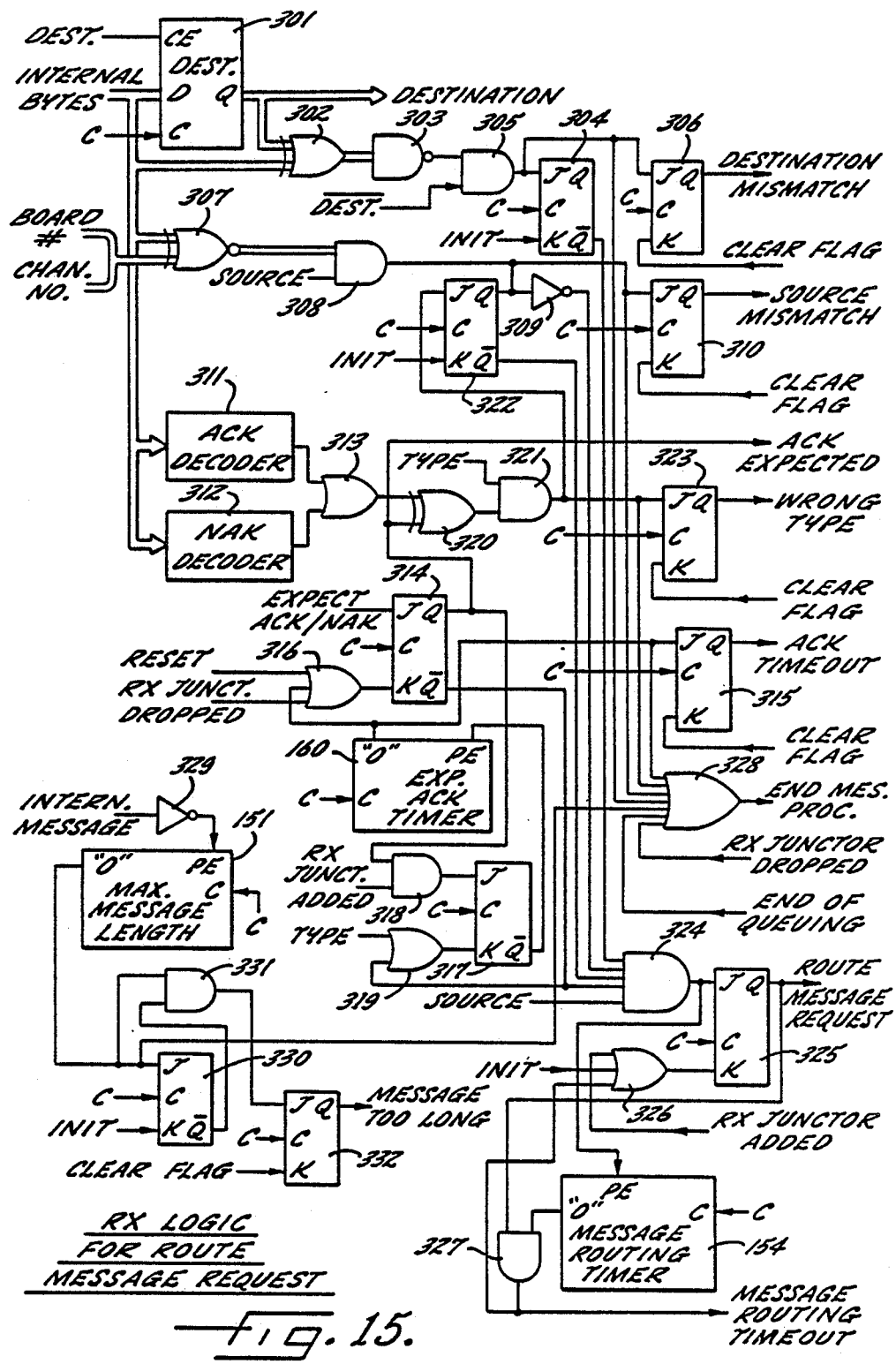
FIG. 15 is a schematic diagram of receiver control logic for generating a request to route a message.

Turning now to FIG. 15, there is shown a schematic diagram of the channel receiver logic for routing a message request and for ending message processing. In general, the channel receiver logic generates a route message request when the destination and destination complement correspond to each other, when the source number in the message corresponds to the physical channel number, and when the type of the message matches the expected type and the expected type is not a ACK or NAK code.

In order to check whether the destination corresponds to the destination complement, the destination is strobed into a register 301. A bank of 2-input exclusive-OR gates 302 and an 8-input NAND gate 303 compare the destination strobed into the register 301 with the data bytes in the received message. A flip-flop 304 checks whether there is a comparison during the time of the DEST. complement strobe. Moreover, a flip-flop 306 is used to give a destination mismatch flag to the diagnostic processor in the event that the destination and destination complement do not correspond to each other. In a similar fashion, the data bytes are inspected by a source comparator including a set of exclusive-OR gates 307 and an AND gate 308 which also receives the SOURCE strobe to provide a signal to an inverter 309 for generating an enable signal when the source number in the message matches the channel number of the channel receiver. Moreover, a flip-flop 310 provides a source mismatch flag to the diagnostic processor. Such a flag may indicate, for example, that a communication cable may have been misrouted from a particular data processing unit to its assigned channel of the computer interconnect coupler.

For the purpose of sensing the type of the message or code, the data bytes are fed to an ACK decoder 311 and a NAK decoder 312 which have outputs combined by an OR gate 313 to provide an indication of whether the message is an ACK or NAK code.

In order for the channel receiver logic to determine whether an ACK or NAK code is expected, a flip-flop 314 is reset by the system reset signal, by the dropping of a junctor assigned to the receiver, and by the expiration of the expected acknowledgment timer 160. The required combination of these signals is provided by an OR gate 316. The expected acknowledgment timer 160 preferably measures the time during which a junctor is reserved for the return transmission of an acknowledgment. Therefore, the expected acknowledgment timer 315 should count when an acknowledgment is expected, beginning at the time that a junctor is added to the channel receiver, and continuing up to the time that the type of the return acknowledgment or message can be determined. Therefore, for controlling the expected acknowledgment timer 160, there is provided a flip-flop 317 which is set by an AND gate 318 when an acknowledgment is expected and when a junctor is added to the channel receiver, and is reset by an OR gate 319 when an acknowledgment is not expected or when the TYPE strobe occurs.

To reject a message or acknowledgment of the wrong type, an exclusive-OR gate 320 compares the expected type from the flip-flop 314 to the received type indicated by the OR gate 313. The output of the exclusive-OR gate is fed to an AND gate 321 enabled by the TYPE strobe in order to set a flip-flop 322 when the type of the message fails to match the expected type. Moreover, the AND gate 321 sets a flip-flop 323 to provide a flag indicating to the diagnostic processor that a message or acknowledgment of the wrong type has been received.

A request to route a message is generated by an AND gate 324 and a flip-flop 325. When the destination and destination complement of the message match, the message has a proper type which is not an acknowledgment code, and the source number of the message matches the physical channel number of the channel receiver. When the flip-flop 325 is set, the message routing timer 154 is also enabled. The flip-flop 325 is reset by an OR gate 326 when a junctor is added to the channel receiver, when the channel receiver is initialized at the beginning of receiving a message or when the routing of the message has been requested by the flip-flop 325 and the message routing timer 154 times out. This last conjunction is determined by an AND gate 327. The AND gate 327 therefore provides a MESSAGE ROUTING TIMEOUT signal which indicates that the central switch logic has failed to respond to the route message request within a certain predetermined time limit which is chosen to ensure that the first-in-first-out buffer (143 in FIG. 4) will store at least the beginning portion of the message without overflowing.

It should be recalled that if the central switch logic (144 in FIG. 4) is not able to route a message because the destination transmitter or receiver is busy or an idle junctor is not available, then it will place the message request on a destination queue and will send a FLOW-CONTROL-ON signal back to the channel receiver and transmitter. If this occurs, then the flip-flop 325 becomes reset by the INIT signal.

Also shown in FIG. 15 is an OR gate 328 which generates the END MES. PROC. signal at the end of processing of a message. Message processing is terminated when there is a destination mismatch, a source mismatch, the receipt of a message or acknowledgment of the wrong type, an acknowledgment timeout, a message length exceeding a certain predetermined maximum message length, a junctor dropped from the channel receiver, or the end of queueing of a message. In order to determine whether the message exceeds a certain maximum message length, the maximum message length counter 151 is held at a preset count in the absence of a message, as indicated by an inverter 329, and when a timeout occurs during a message, a flip-flop 330 becomes set. An AND gate 331 also sets a flip-flop 332 at this time to provide a flag to the diagnostic processor to indicate that the message is too long. The AND gate 331 insures that the flag flip-flop 332 is set no more than once per message.

Figure 16:
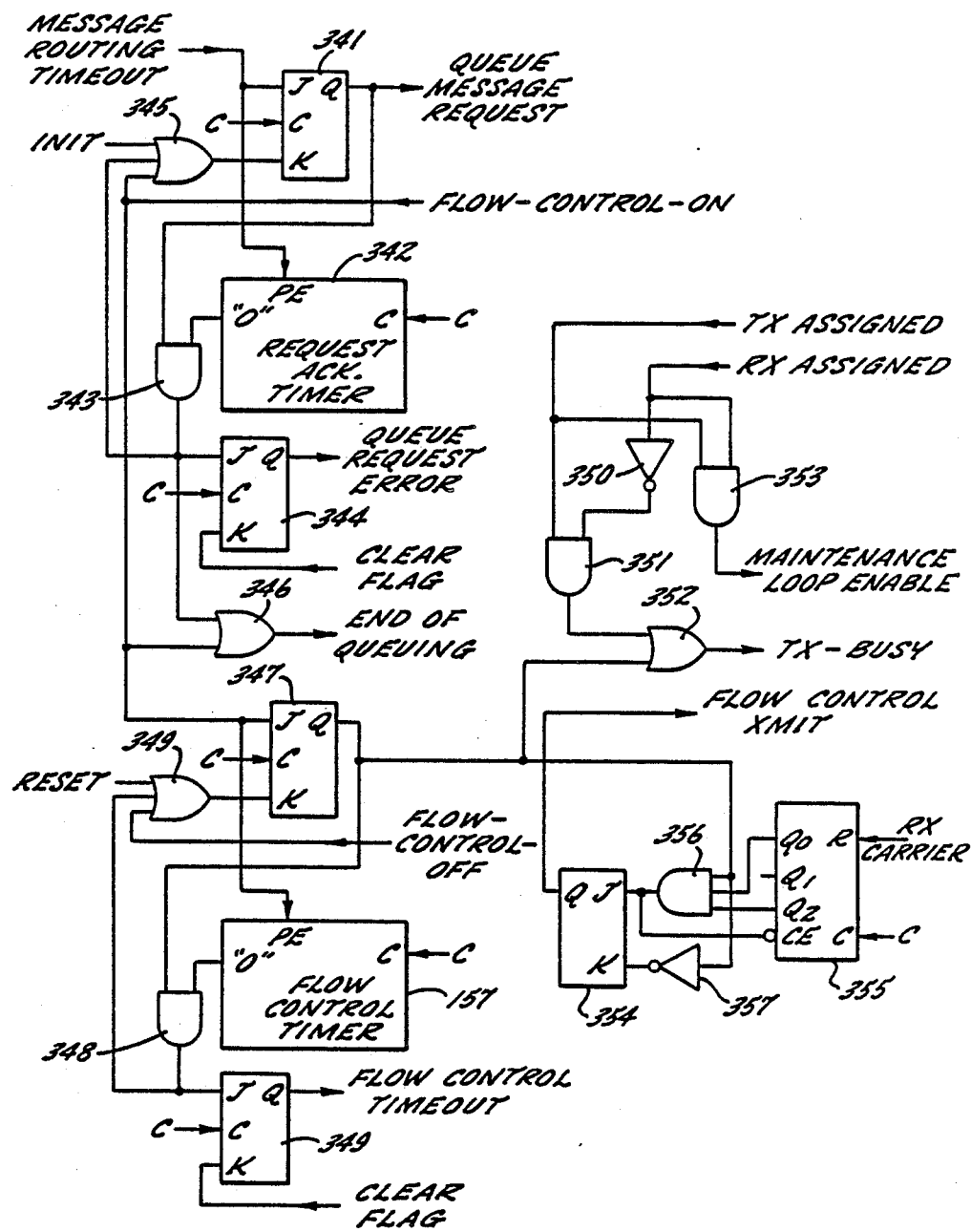
FIG. 16 is a schematic diagram of receiver and transmitter logic for message queuing.

Turning now to FIG. 16, there is shown a schematic diagram of channel receiver and transmitter logic for messages queueing. The MESSAGE ROUTING TIMEOUT signal from FIG. 15 sets a flip-flop 341 which sends a queue message request to the central switch logic. Also, the MESSAGE ROUTING TIMEOUT signal sets a request acknowledgment timer 342. If this timer expires prior to satisfaction of the queue message request, as detected by an AND gate 343, a flip-flop 344 becomes set which indicates to the diagnostic processor a queue request error. The flip-flop 341 generating the queue message request is reset by the INIT signal, by the AND gate 343 upon the occurrence of a queue request error, or, in the usual case, by the FLOW-CONTROL-ON signal from the central switch logic. The combination of these conditions is provided by an OR gate 345. The end of queueing is indicated by another OR gate 346 whenever the queue request error occurs or the flow control is turned on.

The state of the flow control for the transmitter is indicated by a flip-flop 347 which is set by the FLOW-CONTROL-ON signal from the central switch logic, and is reset by the system RESET signal, the FLOW-CONTROL-OFF command from the central switch logic, or upon the expiration of the flow control timer 157 when the flow control is on. The required conjunction and disjunction is provided by an AND gate 348 and an OR gate 349. Expiration of the flow control timer 157 when the flow control is on sets a flip-flop 349 providing a flow control timeout flag to the diagnostic processor.

The channel transmitter is deemed busy if the flow-control flip-flop 347 is set, or if a junctor is assigned to the channel transmitter but not the channel receiver. These conditions are resolved by an inverter 350, an AND gate 351, and an OR gate 352. As described above, the channel receiver is inhibited when the channel transmitter is deemed busy. The channel transmitter and channel receiver, however, can operate simultaneously in the maintenance mode which occurs when junctors are assigned to both the channel transmitter and channel receiver, as detected by an AND gate 353.

It is desirable to delay the transmission of the flow control carrier to a data processing device until any carrier being transmitted by that data control device terminates, and in particular it is desirable to have a pause of about 5 clock cycles between the time that the carrier transmitted by the data processing device disappears and the flow control carrier is turned on. Therefore, a FLOW CONTROL XMIT signal is generated by a flip-flop 354 which is reset in the absence of flow-control and is set 5 clock cycles after the carrier detected by the channel receiver disappears. The required set and reset conditions for the flip-flop 354 are determined by a 3-bit binary counter 355, an AND gate 356, and an inverter 357.

Figure 17:
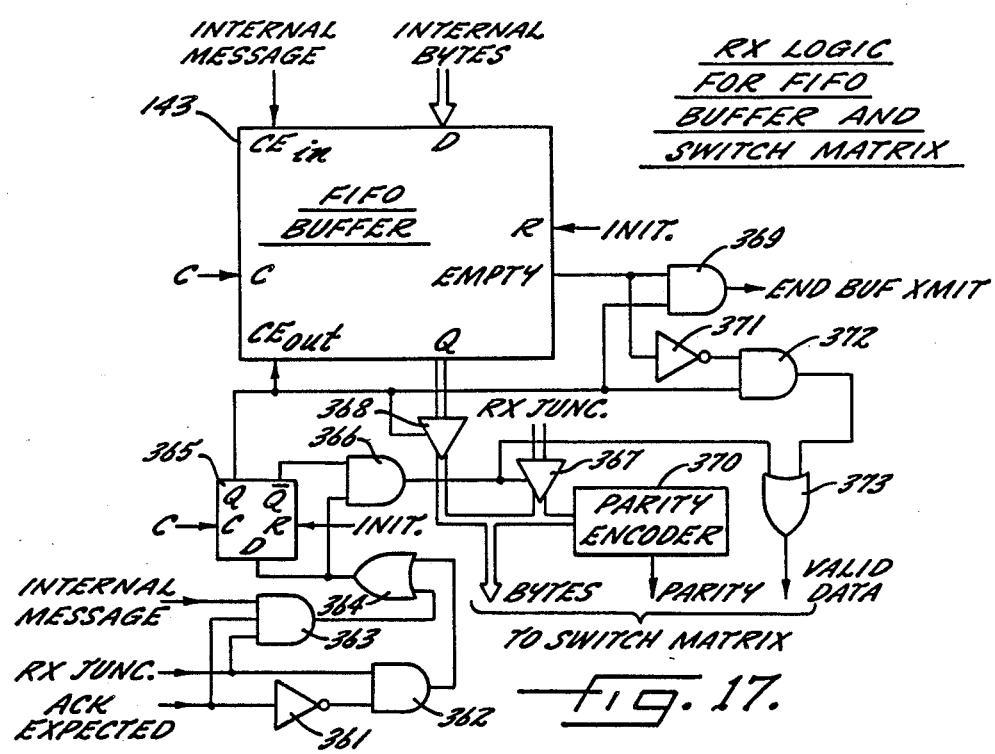
FIG. 17 is a schematic diagram of logic circuitry for a first-in-first-out buffer and for interfacing to a switch matrix.

Turning now to FIG. 17 there is shown channel receiver logic for the first-in-first-out buffer 143 and interfacing to the switch matrix. When the channel receiver is not expecting an acknowledgment, information is transmitted to the switch matrix as soon as a junctor is assigned to a channel receiver, as detected by an inverter 361 and an AND gate 362. When an acknowledgment is expected, transmission to the switch matrix begins when a junctor has been assigned to the channel receiver and the return acknowledgment is received. These conditions are detected by an AND gate 363, and a transmit signal is provided by an OR gate 364. At first a tag is transmitted to the switch matrix, for example, the identification number of the junctor assigned to the channel receiver. After transmission of the tag, data is transmitted from the buffer 143. The time of transmission of the tag is determined by a delay register or flip-flop 365 and an AND gate 366. Either the tag or the data output of the buffer 143 are selected by multiplexing gates 367, 368 for transmission to the switch matrix. The end of transmission is indicated by a signal END BUF XMIT which is generated by an AND gate 369 during data transmission from the buffer when the buffer becomes empty.

In addition to the data bytes from the tag and from the buffer 143, a parity bit and a valid data bit are transmitted over the junctors. The parity bit is generated by a parity encoder 370. A valid data signal is generated whenever the tag is transmitted or when the buffer is not empty during transmission. These logical conditions are resolved by an inverter 371, an AND gate 372, and an OR gate 373.

Figure 18:
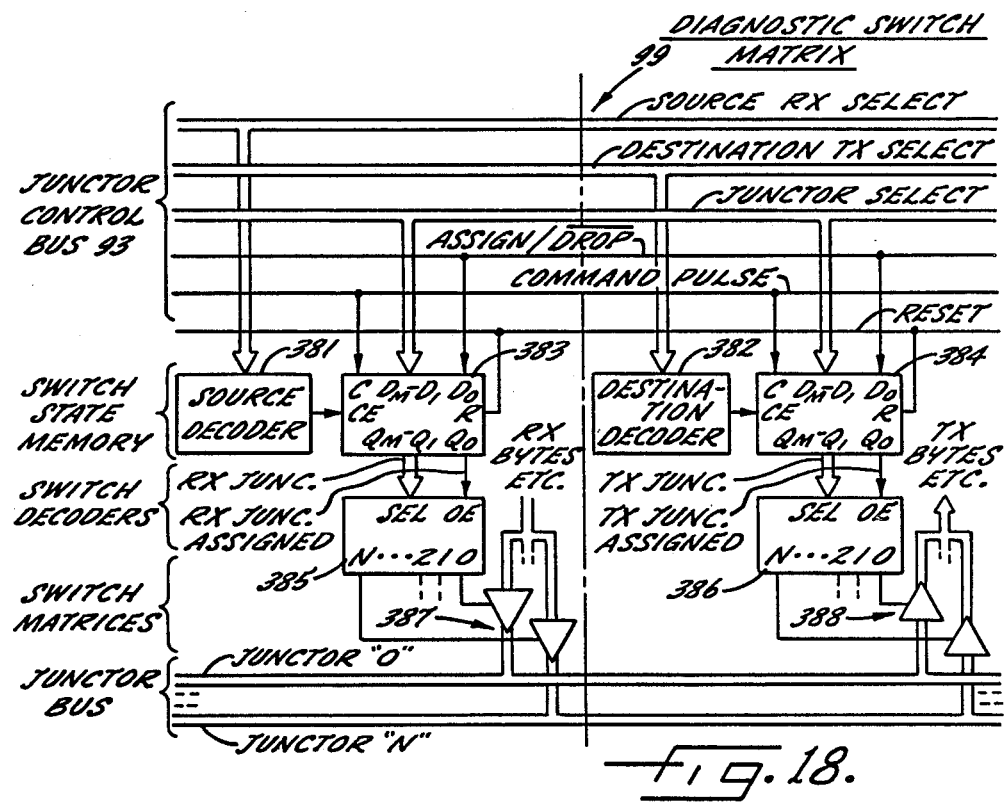
FIG. 18 is a schematic diagram of logic circuitry for a switch matrix and for receiving signals which indicate to the transmitters and receivers whether a junctor is assigned and the identification number of the assigned junctor.

Turning now to FIG. 18, there is shown a schematic diagram of the diagnostic switch matrix 99 and its control circuitry. Origin and destination decoders 381, 382 and latches 383, 384 provide signals indicating whether a junctor is assigned to the channel receiver or the channel transmitter, and if so, the identification numbers of the junctors so assigned. Similar decoders and latches are used by the other channel transmitters and receivers. The junctor control bus 93 includes sets of lines for specifying the source receiver, destination transmitter, and junctor to be assigned or dropped when a command pulse is transmitted over the junctor control bus. A single line specifies whether the command pulse is associated with a junctor assignment operation or a junctor dropping operation. The junctor control bus also includes a reset line to simultaneously drop all of the junctors that are assigned.

For assigning or dropping a junctor, the command pulse clocks the latches 383, 384 which store, respectively, the identification number of the assigned junctor and also the strobed value of the assign/drop line to provide an output bit indicating whether a junctor is assigned or dropped. A respective decoder 385, 386 is associated with each of the latches 383, 384. The select input of each decoder receives the latched junctor identification code. Each decoder also has an output enable input receiving the bit indicating whether the junctor is assigned. The outputs of the decoder, therefore, provide individual select signals for enabling a connection to each junctor. The data to be transmitted and received from the junctor bus are multiplexed onto a selected junctor by a set of gates 387, and demultiplexed by a set of gates 388.

From FIG. 18, it appears that if unidirectional gates are to be used to multiplex data to and from the junctors, then the interconnections of the gates must be different. The inventors, however, have made the surprising discovery that this is not necessarily true, and in fact a multiplexer array can be built using two levels of AND gates to provide both the multiplexing and demultiplexing to and from the junctors.

Figure 19:
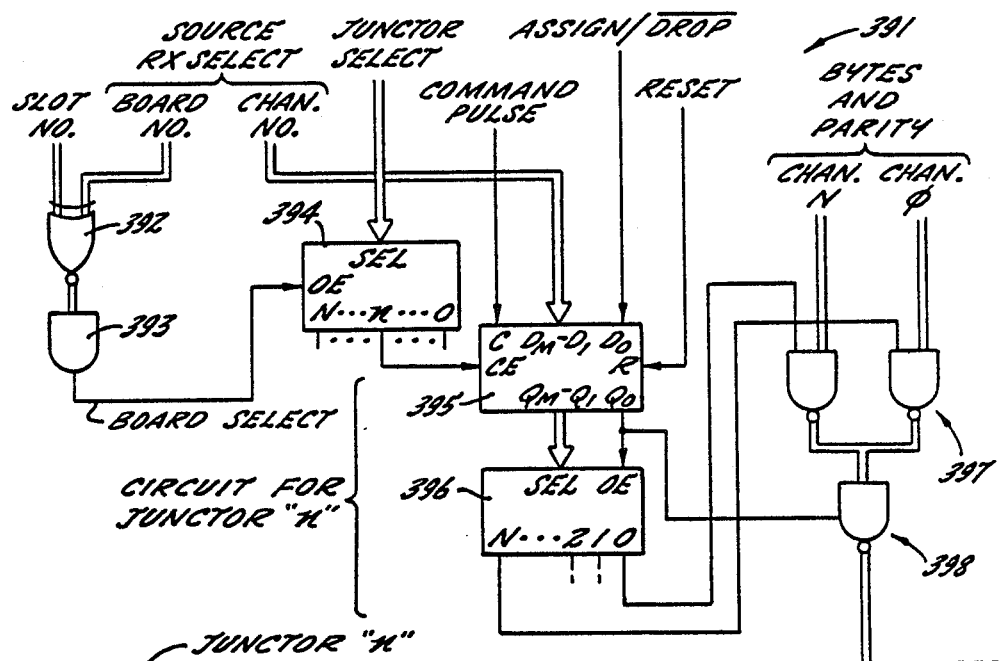
FIG. 19 is a schematic diagram of the preferred switching circuitry for connecting the receivers with the junctors.

Turning now to FIG. 19, there is shown a preferred circuit for a switch matrix generally designated 391 for interfacing a channel receiver to the junctor bus. In accordance with a feature of the present invention, the channel interface boards (122, 123 in FIG. 3) are freely interchangeable without requiring reprogramming of the board decoders. Instead, the different slots in the card cage include a set of terminal connectors which are hard wired to indicate a slot number. When a circuit board is inserted into a particular slot, the slot number therefore appears on a set of input lines to the board. Board decoding is provided by a set of exclusive-OR gates 392 having outputs which are combined in an AND gate 393. The AND gate 393 thereby provides a board select signal. The board select signal is used to enable the outputs of a junctor selector 394, which has individual outputs used to enable the clock of a register 395 which receives the channel number from the source select lines of the junctor control bus, and also receives the assign/drop line from the junctor control bus. The output of the register 395 is fed to the inputs of a decoder 396 which provide individual outputs to enable a first level of NAND multiplexing gates generally designated 397. The outputs of the first level of gates are combined by a second level of NAND gates generally designated 398. The second level of gates 398 are tri-stated by the assign/drop signal latched in the register 394. Instead of using tri-state gates 397, open collector gates could be used so as to provide a wired-OR logic function along the junctors.

Figure 20:
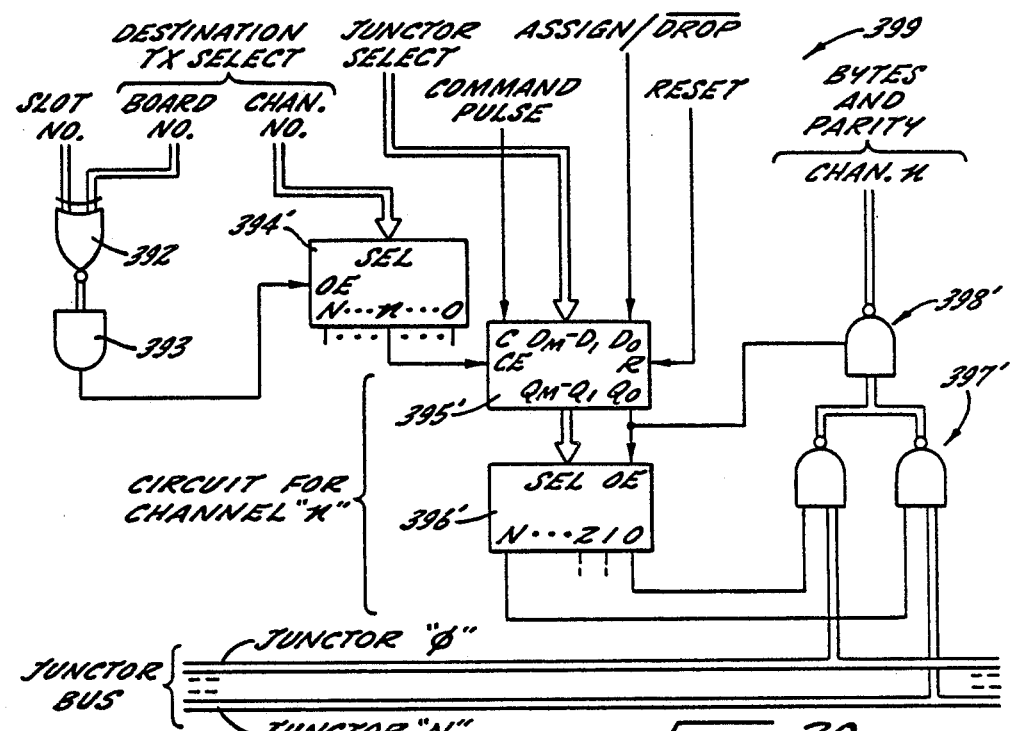
FIG. 20 is a schematic diagram of the preferred circuitry for connecting the junctors to the transmitters.

Turning now to FIG. 20, there is shown a schematic diagram of a switch matrix 399 for the channel transmitters. It should be apparent that the same circuit components can be used as were shown in FIG. 19; all that is required is for the junctor select lines to be switched with the channel number select lines, and for the junctors to be fed to the inputs of the first level of NAND gate 397' instead of the outputs of the second level of the NAND gate 398. In this regard, it should be noted that the number of junctors equals the number of channels on an individual channel interface board. The components used in FIG. 20 which are identical with the components in FIG. 19 are shown with the same reference numerals; similar components are shown with the same but primed reference numerals.

Turning now to FIG. 21, there is shown a schematic diagram of channel receiver logic for initiating the drop junctor and the reverse junctor requests. As resolved by an AND gate 401, a drop junctor request is initiated if the channel receiver is assigned to a junctor, there is a new message request pending, and an acknowledgment is not expected, unless a stuck junctor has been previously detected. Also, as detected by a gate 402, a drop junctor request is initiated if a junctor is assigned to the channel receiver, an acknowledgment is expected, and transmission from the FIFO buffer has ended, unless a stuck junctor has previously been detected. The outputs of the gates 401 and 402 are combined in an OR gate 403 and used to set a flip-flop 404 which indicates the drop junctor request. As resolved by a gate 405, a reverse junctor request is initiated at the end of transmission from the FIFO buffer when an acknowledgment is not expected, unless a stuck junctor has previously been detected. The gate 405 sets a flip-flop 406 which indicates the reverse junctor request.

Failure of a junctor to be dropped or reversed within a certain time period is sensed by the request acknowledgment timer 155. This timer is preset whenever a drop junctor or reverse junctor request is first initiated, as detected by OR gates 407, 408; an inverter 409, and an AND gate 410. A stuck junctor is indicated when the request acknowledgment timer 115 times out and a drop junctor or reverse junctor request is outstanding. This condition is resolved by an AND gate 411. On the occurrence of a stuck junctor, a flip-flop 412 is set to provide a stuck junctor flag sent to the diagnostic processor. The flip-flop 412 also generates a request inhibit signal which inhibits the flip-flop 404 via a NAND gate 413 and also inhibits the flip-flop 406 via NAND gates 414, 415 and an inverter 416.

In order to indicate to the diagnostic processor the identification number of the stuck junctor, there is provided a register 417 which is loaded in response to the stuck junctor signal from the gate 411.

Turning now to FIG. 22, there is shown the logic for detecting the change in the assignment of a junctor to a channel receiver. This logic includes a delay flip-flop 421 which samples the channel receiver junctor assigned signal, an inverter 422, and AND gates 423 and 424.

Turning now to FIG. 23, there is shown a schematic diagram of logic for a channel transmitter. The bytes, parity and valid data signal from the switch matrix 399 of FIG. 20 are clocked into respective registers and flip-flops 431, 432 and 433. The latched valid data signal is combined with the channel transmitter junctor assigned signal in an AND gate 434 to signal the start of transmission. An initial pulse is provided by a delay flip-flop 435 and an AND gate 436. This initial pulse is fed to the serial input of a shift register 437 in order to provide strobe signals for the various data bytes at the beginning of the message transmitted over the assigned junctor. A reset signal for the channel transmitter logic is obtained by an inverter 438 and an OR gate 439 so that the transmitter circuits are reset whenever a system reset occurs, and also whenever valid data are no longer received from a junctor assigned to the channel transmitter.

The parity of the data bytes from the assigned junctor is checked by a parity error detector 440. A NAND gate 441 checks whether a parity error occurs when the data is supposed to be valid, and if so, a flip-flop 442 sets a parity error flag which is sent to the diagnostic processor.

In order to inhibit data transmission if the junctor identification number in the tag of the message fails to match the identification number of the junctor actually assigned to the channel transmitter, a set of exclusive-OR gates 243 and a NAND gate 244 and an AND gate 245 generate a signal if a mismatch occurs. If so, a flip-flop 246 sets a flag sent to the diagnostic processor.

In order to determine whether the channel receiver should expect an acknowledgment, a NAK decoder 247 and an ACK decoder 248 have outputs which are combined in an AND gate 249 to provide a signal which indicates whether the bytes from the junctor fail to include a positive or negative acknowledgment code. Since the channel receiver expects an acknowledgment code when its corresponding channel transmitter previously transmits a message without an acknowledgment code, the shift register cycle counter 437 has an output multiplexer 450 which selects the strobe signals for a message when the receiver expects an acknowledgment code.

In order to inhibit transmission when the destination byte fails to match the channel number of the channel transmitter, there is provided a destination decoder 451 and its output asserted low is gated in an AND gate 452 with the TX-DEST strobe signal to compare the destination byte with the actual channel number of the channel transmitter. The output of the AND gate 452 sets a flip-flop 453 to provide a destination error flag which is sent to the diagnostic processor.

In the event of a destination error, it is desirable to prevent the transmission of even the very beginning portion of the message or acknowledgment. For this purpose, it is necessary to temporarily store the beginning portion of the acknowledgment or message until the destination code can be checked. For this purpose, there is provided a five byte first-in-first-out register 454. Such a register includes a five-bit serial shift register for each of the eight bits in the byte.

In order to provide a signal which will disable transmission in the event that the message or acknowledgment came from the wrong junctor or designates the wrong destination, a flip-flop 455 is set by the TX-RESET and is reset on the occurrence of either a junctor error or a destination error, as indicated by a NOR gate 456. In addition, to determine the initial time of transmission, there is provided another flip-flop 457 which is reset by the TX-RESET signal and is set by the PRE-XMIT signal. Transmission therefore occurs, if at all, starting with the cycle after the PRE-XMIT strobe. During this cycle, which is indicated by the CAR-XMIT strobe, a 55 hexadecimal synchronization code 458 is reinserted in place of the junctor identification number in the message or acknowledgment. For this purpose, there are provided a pair of multiplexing gates 459, 460. The gate 460 is enabled by an AND gate 461 which combines the output of the flip-flops 455 and 457.

In accordance with an important aspect of the present invention, an incoming message can be inserted into the flow control carrier signal sent to a destination data processing device. In this case, it is desirable, however, to insert a pause during which the flow control carrier is absent for a certain period of time before the message or acknowledgment. Moreover, at the end of transmission of the message or acknowledgment, it desirable to insert a pause after the message, in the event that the flow control is still on at this time. During this pause, for example, the data processing device could transmit an acknowledgment to the message.

In order to inhibit the flow control carrier in these cases, there is provided an AND gate 462 which is disabled when the transmitter is busy, when the TX-RESET signal is low, or when a first timer generally designated 463 or a second timer generally designated 464 provide low logic signals. The first timer 463 provides a low logic signal when an acknowledgment is expected and for five clock cycles thereafter. The second timer 464 provides a low logic signal when the message or acknowledgment code is actually transmitted and for five clock cycles thereafter. The timers 463, 464 each comprise respective three-bit binary counters, 465, 466 and respective AND gates 467, 468. An OR gate 469 combines the CAR-XMIT signal with the output of the gate 462 to enable the gate 459 for transmitting the carrier. An OR gate 470 combines the enable signals to the multiplexing gates 459, 460 in order to generate a signal for enabling the actual transmission of carrier, either in the header of a message or during the transmission of data.

The parallel-to-serial converter in the Manchester encoder 147 comprises a parallel-load shift register 471 and an exclusive OR gate 472 which modulates the serial data output of the shift register 471 with the shift clock. The shift clock is provided by a master clock 473 running at eight times the frequency of the internal byte clock. The internal byte clock 281 is provided by a three-bit binary counter clocked by the master clock. The byte clock is obtained from the $Q_2$ output of the counter 281. In order to provide the parallel enable input to the shift register 471, the outputs $Q_2$, $Q_1$, and $Q_0$ of the counter 281 are combined by an AND gate 473. In order to inhibit the transmission of carrier when the flow control is off and when a message or acknowledgment is not being transmitted, the output of the OR gate 470 is supplied as a gating signal to an AND gate 474 which gates the output of the exclusive-OR gate 472.

Turning now to FIG. 24, there is shown a schematic diagram of central switch logic for responding to requests from the channel interface boards. This logic receives the low priority request information and the high priority request information from respective high and low priority ring board arbitrators, as described above in connection with FIGS. 7, 8 and 9.

For receiving a request to be processed, the central switch logic includes an input register 491 which receives the high priority request information if a high priority request is present, or otherwise receives any low priority request information. The multiplexing of the high and low priority request information is performed by a pair of gates 492, 493 and an inverter 494. The input register 491 also receives the signal indicating whether a high priority request is present, the signal indicating whether a low priority request is present, the signal JT indicating whether a time-out has occurred in the junctor timers 161, and a signal QT indicating whether a time-out has occurred from the queue timers 156. The input register 491 also receives an interrupt input asserted low from the diagnostic processor.

Unless the interrupt input is asserted low, when a new request is strobed into the input register 491, a cycle shift counter 396 begins to count. The cycle shift counter presents decoded outputs P0, P1, P2, etc. These outputs are fed to combinational logic 497. Also fed to the combinational logic are individually decoded signals from a priority request decoder 498, including signals indicating a service junctor timer request (SJT), a reverse path request (RP), a drop junctor request (DJ), a route message request (RM), a queue message request (QM), and a service queue timer request (SQT).

The value of the interrupt signal held in the input register 491 provides an enable signal (ENA) which multiplexes the diagnostic control bus 120 into the central logic status memory 153 using a bidirectional gating circuit generally designated 499.

The cycle shift counter 496 counts in succession from P0, P1, etc., until one of many end of processing signals indicates that processing for a request is finished. The end of processing signals are fed to an OR gate 500 which also receives the system RESET signal. The output of the OR gate 500 causes the cycle shift counter to be reset with an initial value of 1, and also enables the clocking of the input register 491 in order to permit the input register to receive a new request. In addition, the input register 491 is enabled to receive a new request if no request is stored in the input register. These conditions are resolved by a NOR gate 502 and an OR gate 503. The signal from the OR gate 503 also provides a done or not busy signal which may be used as a handshake for the interrupt signal.

In order to provide a signal acknowledging a high priority request, there is provided an AND gate 504 which passes the signal from the OR gate 503 when a high priority request is being processed. In a similar fashion, an AND gate 505 passes the output of the OR gate 503 when a low priority request is being processed in order to provide an acknowledgment signal for the low priority request.

The combinational logic 497 determines inputs for state registers 506 having outputs fed back to the combinational logic. Moreover, the combinational logic can read the central logic status memory 153 and also write to the central logic status memory, including specifically the operations of putting a message request on a destination queue and removing a message request from the destination queue. In order to quickly determine whether a message request is permitted, the combinational logic includes specific logic 507 for determining permitted routing.

Turning now to FIG. 25, there is shown a schematic diagram of the request priority decoder 498. The requests are generated by respective AND gates 511, 512, 513, 514, 515, and 516. All of these gates are gated by the output enable line (OE).

The service junctor timer has the highest priority, as should be evident from the fact that its gate 511 has only two inputs, and the $Q_4$ input to the request priority decoder inhibits all of the other AND gates. The reverse path (RP) and drop junctor (DJ) requests have the next highest priority, as evident from the fact that they are enabled by the $Q_2$ input which disables all of the other AND gates except the gate 511 generating the service junctor timer request. The route message (RM) and queue message (QM) requests have the next lowest priority. This should be evident from the fact that they are enabled by the $Q_1$ input which disables only the AND gate 516 for the service queue timer (SQT). The service queue timer request (SQT) has the lowest priority, since it is disabled by the presence of any one of the other requests. The low priority request uses an inverter 517 to inhibit the service queue timer request. The high priority requests use an inverter 518 to inhibit the low priority requests and the service queue timer requests. The service junctor timer request uses an inverter 519 to inhibit all of the other requests. An inverter 520 is used to select between the two different priority requests in each of the high and low priority request groups.

Turning now to FIG. 26, there is shown a schematic diagram of the logic generally designated 507 for permitted routing. The OR gate 242 generates a signal indicating whether the specified source and destination are included in at least one virtual star coupler, as was described above in connection with FIGS. 10 and 11. In addition, routing is not permitted if the destination and source are the same, or if the destination has been placed in the "loopback" mode, as indicated by the destination status table 167. Coincidence between the destination and source is detected by a set of exclusive-OR gates 541 and a NOR gate 542. An inverter 543 prevents routing from the source to the destination in the case of loopback. Routing is also inhibited if the destination does not exist.

The logic for permitted routing 507 is enabled during the P0 cycle of the central switch logic, and is enabled for both the route message and the queue message service requests, as indicated by an OR gate 544. A NAND gate 545 resolves the required coincidence for terminating processing of a route message or a queue message command. When processing is terminated due to impermissible routing, a message reject flag is set to inform the diagnostic processor of the impermissible routing.

Turning now to FIG. 27, there is shown the combinational logic for the high priority requests. In the first cycle of the reverse path request, as resolved by an AND gate 521, the junctor currently assigned to the source is read from the source table (168 in FIG. 6), and the junctor identification number is strobed into a junctor register. This entry in the source table is cleared to indicate the impending dropping of the junctor from the source. Also, the junctor assignment is cleared from the destination table (169 in FIG. 6). Also, the corresponding entry in the junctor table (170 in FIG. 6) is also cleared. In addition, a command is sent to the junctor control bus to drop the junctor from the source receiver and destination transmitter.

The second cycle of processing for the reverse path request is resolved by an AND gate 522. The junctor identification number saved in the junctor register is written into the source table (168 in FIG. 6). Similarly, this junctor identification number is written into the destination table (169 in FIG. 6), and also this junctor identification number is written into the junctor table (170 in FIG. 6) along with its assigned destination receiver and source transmitter. A command is also transmitted to the junctor bus to assign the junctor to the destination receiver and the source transmitter, and the reverse junctor timer for the respective junctor is turned on. In addition, the end of processing is reached.

In the first cycle of a service junctor timer request, the source and destination for the expired junctor timer are obtained in response to a gate 523. In response to gates 524 and 525, in the first cycle of the processing of the service junctor timer or the drop junctor request, the queue pointers for the queue of the requesting channel are obtained from the queue pointer tables (171, 172, 173 in FIG. 6). In this regard, the source select signal (SRC) is provided by a gate 526 and when this is done the destination select signal (DST) is inhibited by an inverter 527. It should be noted that normally the queue pointer memory is addressed by the destination channel number.

An inverter 528 and a gate 529 cause processing to be ended if the source table (168 in FIG. 6) indicates that a junctor is not assigned. Otherwise, a gate 530 and an inverter 531 enable processing to be done when the source queue is not empty. Specifically, to determine whether the source queue is empty, the pointer to the head of the queue (the output of the table 173 in FIG. 6) is compared to the pointer to the tail of the queue (the output of the table 173 in FIG. 6). If the pointer to the head is not equal to the pointer of the tail, then the queue is not empty. In this case, the queue timer for the source channel number is reset and is started, and a flow-control-off command is sent to the transmitter of the channel number indicated at the head of the queue.

In the second processing cycle for the service junctor or drop junctor requests, as resolved by a gate 532, processing is ended if no junctor is assigned to the source channel receiver. Otherwise, as detected by a gate 534, the junctor status table is read for the assigned junctor and the junctor identification number is strobed into a register.

During the third cycle of processing for the service junctor timer or drop junctor request, as resolved by a gate 535, processing is ended and a diagnostic service flag is set if the assigned junctor is inactive. The logical condition is resolved by an inverter 536 and an AND gate 537. Otherwise, as determined by a gate 538, the junctor assigned bits are cleared in the source receiver and the destination transmitter status tables, the junctor active bit is cleared from the junctor status table, and the respective junctor timer is cleared. Moreover, a command is set over the junctor control bus to drop the connection of the junctor from the source receiver and the destination transmitter, and processing is ended. In addition, as resolved by an inverter 539 and a gate 540, if there are any requests in the destination message queue, then the queue timer for that destination queue is started and a flow-control-off command is sent to the channel transmitter indicated at the head of that queue.

Turning now to FIG. 28, there is shown the combinational logic (497 in FIG. 24) for message queueing. Message queueing may occur during the processing of a route message request as well as a queue message request, as indicated by an OR gate 551. In the first cycle, processing is ended if the destination is in the loopback mode, as resolved by a gate 552. Otherwise, for processing a route message request, the destination receiver is polled for carrier status unless the message is being rejected by the message reject logic (507 in FIG. 26). These conditions are resolved by inverters 553, 554 and a gate 555.

In the second cycle of processing of a route message or a queue message command, an OR gate 556 determines whether there is no idle junctor, a queue message request is being processed, the destination transmitter is assigned to a junctor, or if the destination receiver has detected a carrier. If so, and if the source channel is at the head of the destination queue, then a gate 557 restarts the queue timer for the destination queue and processing is ended. Otherwise, as resolved by an inverter 558 and a gate 559, if the queue entry table indicates that the source is on the destination queue, then a flow-control-on command is sent to the source receiver, and processing is ended. Otherwise, if the source is not on the destination queue at all, as indicated by an inverter 560, then if a junctor is assigned to the destination transmitter or the queue is not empty, as resolved by an inverter 561 and a gate 562, then a gate 563 causes the source channel number to be put onto the destination queue. In addition, the queue pointer is updated and an entry is put into the queue entry table to indicate that the source channel number is on the destination queue. Also, a flow-control on command is sent to the source channel receiver, and processing is ended.

Otherwise, if the gate 562 and an inverter 564 indicate that a junctor is not assigned to the destination transmitter and the destination queue is empty, then a gate 565 causes the source number to be put onto the destination queue. In addition, the queue pointer is updated and the queue entry table is set in accordance with the putting of a source number onto a destination queue. Also, the timer for the destination queue s started, and processing is ended.

Turning now to FIG. 29, there is shown the central switch combinational logic for routing a message. In the second cycle of processing for a route message request, routing occurs if the destination receiver did not indicate carrier, the transmitter of the destination is not assigned to a junctor, and a junctor is idle. These conditions are resolved by inverters 571, 572 and a gate 573. In addition, if the source channel is on the destination queue, as further resolved by a gate 574, the source number is removed from the destination queue by updating the queue pointer and clearing the queue entry table. Also, the queue timer corresponding to the destination is cleared.

Turning now to FIG. 30, there is shown a schematic diagram of the combinational logic in the central switch logic for servicing queues having expired timers. In the first cycle, as resolved by a gate 581, the identification number of the expired queue timer is saved. Also, the entry at the head of the queue corresponding to the expired timer is removed by updating the queue pointer and clearing the queue entry table. In addition, the queue timer is cleared.

Processing of a service queue timer request is ended in the second cycle, as resolved by a gate 582. An additional gate 583 determines if the queue is not empty, and if so, then a flow-control-off command is sent to the channel receiver having a channel number which is found at the new head of the destination queue corresponding to the number of the expired queue timer. Also, the expired queue timer is reset and started. This completes the description of the central switch logic.

In view of the above, there has been described an improved computer interconnect coupler in which a channel transmitter and a channel receiver are switched to a particular one of a plurality of junctors. Since a number of junctors are available, the connectivity and bandwidth of the coupler is greatly increased. By storing the initial portion of the messages in a buffer while the messages are being routed, existing computer equipment can be used with the coupler. The computer interconnect coupler does not appear to modify the messages which are passed through it, except for causing a slightly increased transmission delay through the computer interconnect coupler.

The computer interconnect coupler can be programmed to behave as if it were comprised of a number of star couplers, and the set of devices connected to the star couplers can be changed without physical recabling, merely by reprogramming a central logic status memory. Also, the definitions of these virtual star couplers can be made consistent in each of a redundant number of couplers by exchanging the virtual star coupler definitions between the computer interconnect couplers.

By employing a rotating priority scheme and also by passing the slot number from the back plane to the channel interface boards, the computer interconnect coupler can be incrementally expanded merely be adding additional boards and there is no need for reprogramming to insure equal access priority with respect to the computer equipment originally connected to the coupler. The logic and signal connections for implementing such a rotating priority scheme are considerably simplified by subdividing and duplicating the logic according to a hierarchial arrangement.

Since the computer interconnect coupler is monitored by a diagnostic processor and there are various timers and flags which indicate fault conditions, the fault can be pinpointed to a particular circuit board and the status of the system at the time of diagnosis can be stored in non-volatile memory on the board to thereby accelerate the repair process, and to insure to a higher degree that faults on the board will be repaired before the board is reinstalled.

The ability of the computer interconnect coupler to handle heavy loading conditions is facilitated by queueing the message requests and using flow control to inhibit retransmissions until the message request appears at the head of the destination queue. Also, the flow control is made more efficient by the insertion of incoming messages into the flow control carrier with pauses and by permitting the inserted messages to be acknowledged using the usual message acknowledgment protocol. After such an exchange of an inserted message and its acknowledgment, the flow control may continue without requiring the retransmission of the original message request. The queueing and servicing of such message requests is made very reliable by the use of a set of queue timers which release reserved channels in the event that the data processing devices do not retransmit their messages within a reasonable period of time after the flow control is turned off. The overall scheme of message routing, queueing and flow control is even more efficient by providing central logic which executes service requests according to a multi-level priority scheme in which certain requests are grouped in the same priority level.

APPENDIX 1
LOGICAL EQUATIONS FOR CHANNEL SELECTION LOGIC (222 in FIG. 9)
[For N = 7 to select one of eight channels]

```
CH0:  OUTPUT = CH0__RQ*EN7 +
      (CH0__RQ*CH1__RQ*CH2__RQ*CH3__RQ*CH4__RQ*CH5__RQ*CH6__RQ*CH7__RQ*END)+
      (CH0__RQ*CH2__RQ*CH3__RQ*CH4__RQ*CH5__RQ*CH6__RQ*CH7__RQ*EN1) +
      (CH0__RQ*CH3__RQ*CH4__RQ*CH5__RQ*CH6__RQ*CH7__RQ*EN2) +
      (CH0__RQ*CH4__RG*CH5__RQ*CH6__RQ*CH7__RQ*EN3) +
      CH0__RQ*CH5__RQ*CH6__RQ*CH7__RQ*EN4) +
      (CH0__RQ*CH6__RQ*CH7__RQ*EN5) +
      (CH0__RQ*CH7__RQ*EN6)
CH1:  OUTPUT =    [add 1, with modulo-8 arithmetic, to each number in the above equation]
      .
      .
      .
CH7:  0UTPUT = CH7__RQ*EN6 +
      (CH7__RQ*CH0__RQ*CH1__RQ*CH2__RQ*CH3__RQ*CH4__RQ*CH5__RQ*CH6__RQ*EN7) +
      (CH7__RQ*CH1__RQ*CH2__RQ*CH3__RQ*CH4__RQ*CH5__RQ*CH6__RQ*EN0) +
      (CH7__RQ*CH2__RQ*CH3__RQ*CH4__RQ*CH5__RQ*CH6__RQ*EN1) +
      (CH7__RQ*CH3__RG*CH4__RQ*CH5__RQ*CH6__RQ*EN2) +
      (CH7__RQ*CH4__RQ*CH5__RQ*CH6__RQ*EN3) +
      (CH7__RQ*CH5__RQ*CH6__RQ*EN4) +
      (CH7__RQ*CH6__RQ*EN5)
```

What is claimed is:

1. A computer interconnect coupler for transmitting messages among multiple data processing devices each of which has a communication port, said messages including destination address data designating respective ones of said data processing devices to receive respective ones of said messages, said coupler comprising a plurality of electronic crossbar switches each of which is connected to a respective communication port of an associated one of said data processing devices to provide a communication channel for receiving messages from and sending messages to said associated one of said data processing devices, said crossbar switches having separate receiving means and transmitting means for each of said channels, a plurality of junctors associated with each of said crossbar switches for transmitting messages among said crossbar switches, and central switch logic means connected to all of said crossbar switches for assigning junctors to transmit the messages arriving at one of said crossbar switches from a source device to a crossbar switch connected to a destination device designated by the message, wherein each of said receiving means includes a respective means for obtaining said destination address data from messages received over its respective channel from its associated data processing device, and a respective means for sending the destination address data so obtained to said central switch logic means, and wherein said central switch logic means includes means for accepting said destination address data sent to it from said means for sending included in the receiving means for each of said channels whereby said central logic means identifies the destination devices designated by the messages for said assigning of said junctors.

2. The computer interconnect coupler of claim 1 wherein each of said receiving means includes a respective buffer means for storing portions of said messages following said destination address data while the respective sending means sends said destination address data to said central switch logic means whereby said stored portions of said messages are available for transmission when said central logic means assigns respective junctors for transmitting said messages.

3. The computer interconnect coupler of claim 1 which includes a system clock, and wherein each receiving means includes a respective means for synchronizing said messages with said clock.

4. A computer interconnect coupler for transmitting messages among multiple data processing devices each of which has a communication port, said coupler comprising a plurality of electronic crossbar switches each of which is connected to a respective communication port of an associated one of said data processing devices to provide a communication channel for receiving messages from and sending messages to said associated one of said data processing devices, said crossbar switches having separate receiving means and transmitting means for each of said channels, a plurality of junctors associated with each of said crossbar switches for transmitting messages among said crossbar switches, and central switch logic means connected to all of said crossbar switches for assigning junctors to transmit the messages arriving at one of said crossbar switches from a source device to a crossbar switch connected to a destination device designated by the message, wherein said computer interconnect coupler includes a respective switch matrix for connecting the receiving means and the transmitting means of each channel to junctors assigned by said central switch logic means.

5. The computer interconnect coupler of claim 4 which includes means responsive to the transmission of a message to its destination for reversing the states of the switching matrices of the message-originating channel and the destination channel so that the junctor used to transmit said message can be used to immediately transmit data in the reverse direction, and means for transmitting an acknowledgement over said junctor in said reverse direction from the destination channel to the message-originating channel to provide the message-originating device with an immediate acknowledgement that said message has been successfully transmitted.

6. The computer interconnect coupler of claim 4 wherein said central switch logic means includes means for receiving message information randomly from multiple channels and signalling the receiving means for the message-originating channels as junctors are assigned for transmission of their respective messages to the respective destination channels.

7. A computer interconnect coupler for transmitting messages among multiple data processing devices each of which has a communication port, said coupler comprising a plurality of electronic crossbar switches each of which is connected to a respective communication port of an associated one of said data processing devices to provide a communication channel for receiving messages from and sending messages to said associated one of said data processing devices, said crossbar switches having separate receiving means and transmitting means for each of said channels, a plurality of junctors associated with each of said crossbar switches for transmitting messages among said crossbar switches, and central switch logic means connected to all of said crossbar switches for assigning junctors to transmit the messages arriving at one of said crossbar switches from a source device to a crossbar switch connected to a destination device designated by the message, wherein said computer interconnect coupler includes a timer for disconnecting an assigned junctor from a message-originating channel if said junctor remains connected to said channel beyond a predetermined time interval.

8. A computer interconnect coupler for transmitting messages among multiple data processing devices each of which has a communication port, said coupler comprising a plurality of electronic crossbar switches each of which is connected to a respective communication port of an associated one of said data processing devices to provide a communication channel for receiving messages from and sending messages to said associated one of said data processing devices, said crossbar switches having separate receiving means and transmitting means for each of said channel, a plurality of junctors associated with each of said crossbar switches for transmitting messages among said crossbar switches, and central switch logic means connected to all of said crossbar switches for assigning junctors to transmit the messages arriving at one of said crossbar switches from a source device to a crossbar switch connected to a destination device designated by the message, wherein said computer interconnect coupler includes a diagnostic processor and a diagnostic switch matrix for connecting said diagnostic processor to said communication channels via said junctors.

9. The computer interconnect coupler of claim 8 in which said central switch logic means and each of said crossbar switches include an error flag register and means for interrupting said diagnostic processor when an error occurs, and said diagnostic processor includes means for accessing said error flag register in response to such an interrupt.

10. A computer interconnect coupler for transmitting messages among multiple data processing devices each of which has a communication port, said coupler comprising a plurality of electronic crossbar switches each of which is connected to a respective communication port of an associated one of said data processing devices to provide a communication channel for receiving messages from and sending messages to said associated one of said data processing devices, said crossbar switches having separate receiving means and transmitting means for each of said channels, a plurality of junctors associated with each of said crossbar switches for transmitting messages among said crossbar switches, and central switch logic means connected to all of said crossbar switches for assigning junctors to transmit the messages arriving at one of said crossbar switches from a source device to a crossbar switch connected to a destination device designated by the message, wherein said computer interconnect coupler includes a maintenance loop for connecting the transmitting means directly to the receiving means for the same channel for diagnostic purposes, means for supplying a diagnostic message to said transmitting means and via said maintenance loop to said receiving means, and means for comparing the diagnostic message received by said receiving means with the diagnostic message supplied to said transmitting means.

11. A computer interconnect coupler for transmitting messages among multiple data processing devices each of which has a communication port, said coupler comprising a plurality of electronic crossbar switches each of which is connected to a respective communication port of an associated one of said data processing devices to provide a communication channel for receiving messages from and sending messages to said associated one of said data processing devices, said crossbar switches having separate receiving means and transmitting means for each of said channels, a plurality of junctors associated with each of said crossbar switches for transmitting messages among said crossbar switches, and central switch logic means connected to all of said crossbar switches for assigning junctors to transmit the messages arriving at one of said crossbar switches from a source device to a crossbar switch connected to a destination device designated by the message, wherein said computer interconnect coupler includes means for appending to each message prior to transmission onto a respective assigned junctor, data identifying the assigned junctor; and means for inspecting the appended data from each message received from a junctor onto which the message was intended to be transmitted.

12. The computer interconnect coupler of claim 11 which includes means for preventing transmission of all portions of the messages to the destination device when said means for inspecting determines that a message is received from a junctor different from the junctor onto which the message was intended to be transmitted.

13. The computer interconnect coupler of claim 11, including means for stripping off the appended data from each received message prior to transmission of the received message to the destination device.

14. A computer interconnect coupler for transmitting messages among multiple data processing devices each of which has a communication port, said coupler comprising a plurality of electronic crossbar switches each of which is connected to a respective communication port of an associated one of said data processing devices to provide a communication channel for receiving messages from and sending messages to said associated one of said data processing devices, said crossbar switches having separate receiving means and transmitting means for each of said channels, a plurality of junctors associated with each of said crossbar switches for transmitting messages among said crossbar switches, and central switch logic means connected to all of said crossbar switches for assigning junctors to transmit the messages arriving at one of said crossbar switches from a source device to a crossbar switch connected to a destination device designated by the message, wherein said computer interconnect coupler includes, for each transmitting means, means for detecting the presence of an error by inspecting each message received from a junctor to determine whether the received message designates the destination device connected to the channel of the transmitting means.

15. The computer interconnect coupler of claim 14 which includes means for preventing transmission of the message to the destination device when said means for inspecting determines that a received message does not designate the destination device connected to the channel of the transmitting means.

16. The computer interconnect coupler of claim 1 which includes a junctor control bus from said central switch logic means which connects control inputs of said crossbar switches in parallel relation.

17. The computer interconnect of claim 16, wherein said crossbar switches have control inputs receiving from said junctor control bus, an encoded number designating a particular junctor, and signals for selectively closing and opening a switch connected to the designated junctor.

18. A computer interconnect coupler for transmitting messages among multiple data processing devices each of which has a communication port, said coupler comprising
a plurality of electronic crossbar switches each of which is connected to a respective communication port of an associated one of said data processing devices to provide a communication channel for receiving messages from and sending messages to said associated one of said data processing devices, said crossbar switches having separate receiving means and transmitting means for each of said channels,
a plurality of junctors associated with each of said crossbar switches for transmitting messages among said crossbar switches, and
central switch logic means connected to all of said crossbar switches for assigning junctors to transmit the messages arriving at one of said crossbar switches from a source device to a crossbar switch connected to a destination device designated by the message,
wherein said computer interconnect coupler includes a junctor control bus from said central switch logic mean which connects control inputs of said crossbar switches in parallel relation, said crossbar switches have control inputs receiving from said junctor control bus, an encoded number designating a particular junctor, and signals for selectively closing and opening a switch connected to the designated junctor, and wherein said signals for selectively closing and opening includes a single bit command signal and a single bit assign/drop signal, and wherein said crossbar switches include registers which are strobed by said command signal and latch said encoded number and said assign/drop signal.

19. The computer interconnect coupler of claim 18, wherein said crossbar switches are disposed on a plurality of different printed circuit boards, and wherein the number of said crossbar switches on each of said boards equals the number of junctors interconnecting said crossbar switches.

20. The computer interconnect coupler of claim 19 wherein said number of junctors is eight.

21. The computer interconnect coupler of claim 18, wherein the crossbar switches are provided on at least one integrated circuit, said integrated circuit providing switching circuits for a number of crossbar switches, said switching circuits being interconnected by the same number of junctors.

22. A computer interconnect coupler for transmitting messages among multiple data processing devices each of which has a communication port, said coupler comprising
a plurality of electronic crossbar switches each of which is connected to a respective communication port of an associated one of said data processing devices to provide a communication channel for receiving messages from and sending messages to said associated one of said data processing devices, said crossbar switches having separate receiving means and transmitting means for each of said channels,
a plurality of junctors associated with each of said crossbar switches for transmitting messages among said crossbar switches, and
central switch logic means connected to all of said crossbar switches for assigning junctors to transmit the messages arriving at one of said crossbar switches from a source device to a crossbar switch connected to a destination device designated by the message, wherein the crossbar switches are provided on at least one integrated circuit, said integrated circuit providing switching circuits for a number of crossbar switches, said switching circuits being interconnected by the same number of junctors, and
wherein said switching circuits provide unidirectional data paths from said receiving means to said junctors and from said junctors to said transmitting means, but the same switching circuits are used for both multiplexing messages to an assigned junctor, and demultiplexing messages from an assigned junctor.

23. The computer interconnect coupler of claim 22 wherein said switching circuits comprise two levels of NAND gates.

24. A method of transmitting messages among multiple data processing devices each of which has a communication port, said method comprising the steps of
transmitting messages over as respective communication channel from the port of each data processing device to a respective electronic crossbar switch having respective receiving means and transmitting means for that particular device, each of said messages including address data identifying the desired destination of the message,
selecting a junctor for transmitting each message arriving at a receiving means to the transmitting means of the electronic crossbar switch for the data processing device at the destination identified in the message,
connecting the selected junctor to the crossbar switches of the message-originating device and the destination device, and
transmitting each message from the crossbar switch of the message-originating device via the selected junctor to the transmitting means for the destination device, and then on to the destination device,
wherein said method further includes the step of verifying that a message arriving at the receiving means has originated from the data processing device that is supposed to be connected to the receiving means before selecting a junctor for transmitting the message.

25. A method of transmitting messages among multiple data processing devices each of which has a communication port, said method comprising the steps of
transmitting messages over a respective communication channel from the port of each data processing device to a respective electronic crossbar switch having respective receiving means and transmitting means for that particular device, each of said messages including address data identifying the desired destination of the message,
selecting a junctor for transmitting each message arriving at a receiving means to the transmitting means of the electronic crossbar switch for the data processing device at the destination identified in the message, connecting the selected junctor to the crossbar switches of the message-originating device and the destination device, and transmitting each message from the crossbar switch of the message-originating device via the selected junctor to the transmitting means for the destination device, and then on to the destination device, wherein said method further includes the step of verifying that a message has reached the transmitting means for the desired destination before transmitting that message to the data processing device connected thereto.

26. The method of claim 24 wherein said messages are transmitted asynchronously from said multiple data processing devices.

27. The method of claim 24 wherein messages arriving at a receiving means are delayed to synchronize said messages with a system clock.

28. The method of claim 25 which includes the step of checking the format of header data in each message received by a receiving means and selecting a junctor to transmit that message only if the format of said header data satisfies predetermined criteria.

29. A method of transmitting messages among multiple data processing devices each of which has a communication port, said method comprising the steps of transmitting messages over a respective communication channel from the port of each data processing device to a respective electronic crossbar switch having respective receiving means and transmitting means for that particular device, each of said messages including address data identifying the desired destination of the message, selecting a junctor for transmitting each message arriving at a receiving means to the transmitting means of the electronic crossbar switch for the data processing device at the destination identified in the message, connecting the selected junctor to the crossbar switches of the message-originating device and the destination device, and transmitting each message from the crossbar switch of the message-originating device via the selected junctor to the transmitting means for the destination device, and then on to the destination device, wherein said method further includes the steps of connecting the selected junctor to the receiving means of the message-originating device and the transmitting means of the destination device for transmitting each message, and then immediately connecting the selected junctor to the receiving means of the destination device and the transmitting means of the message-originating device so that the junctor used to transmit said message can be used to immediately transmit data in the reverse direction, and transmitting an acknowledgement code over said junctor in aid reverse direction from the destination device to the message-originating device to provide the message-originating device with an immediate acknowledgement that said message has been successfully transmitted.

30. The method of claim 29 which includes the steps of receiving message information randomly from multiple data processing devices and signalling the receiving means for the message-originating devices as junctors are selected for transmission of their respective messages to the respective destination devices.

31. A method of transmitting messages among multiple data processing devices each of which has a communication port, said method comprising the steps of transmitting messages over a respective communication channel from the port of each data processing device to a respective electronic crossbar switch having respective receiving means and transmitting means for that particular device, each of said messages including address data identifying the desired destination of the message, selecting a junctor for transmitting each message arriving at a receiving means to the transmitting means of the electronic crossbar switch for the data processing device at the destination identified in the message, connecting the selected junctor to the crossbar switches of the message-originating device and the destination device, and transmitting each message from the crossbar switch of the message-originating device via the selected junctor to the transmitting means for the destination device, and then on to the destination device, wherein said method further includes the step of disconnecting a selected junctor from a message-originating device if said junctor remains connected to said device beyond a predetermined time interval.

32. The computer interconnect coupler of claim 22, wherein said crossbar switches are connected to said central switch logic means via a junctor control bus, and said crossbar switches have control inputs receiving from said junctor control bus, an encoded number designating a particular junctor, and signals for selectively closing and opening a switch connected to the designated junctor.

33. The computer interconnect coupler of claim 32 wherein said signals for selectively closing and opening includes a single bit command signal and a single bit assign/drop signal, and wherein said crossbar switches include registers which are strobed by said command signal and latch said encoded number and said assign/drop signal.

34. The computer interconnect coupler of claim 22 wherein said crossbar switches are disposed on a plurality of different printed circuit boards, and wherein the number of said crossbar switches on each of said boards equals the number of junctors interconnecting said crossbar switches.

35. The computer interconnect coupler of claim 34 wherein said number of junctors is eight.

* * * * *

UNITED STATES PATENT AND TRADEMARK OFFICE
CERTIFICATE OF CORRECTION

PATENT NO. : 4,845,722
DATED : July 4, 1989
INVENTOR(S) : Allan R. Kent et al.

It is certified that error appears in the above-identified patent and that said Letters Patent is hereby corrected as shown below:

In the Abstract, line 19, change "imcoming" to --incoming--.

Col. 4, line 14, please change "above mentioned" to --above-mentioned--.

Col. 20, line 13, please change "22" to --220--.

Col. 34, line 59, please change "s" to --is--.

Col. 35, line 52, please change "CH0" to --(CH0--.

Col. 40, line 19, please change "messages" to --message--.

Col. 43, line 58, please change "aid" to --said--.

Signed and Sealed this

Second Day of October, 1990

Attest:

HARRY F. MANBECK, JR.

*Attesting Officer*  *Commissioner of Patents and Trademarks*